United States Patent [19]
Shaver et al.

[11] Patent Number: 5,974,501
[45] Date of Patent: Oct. 26, 1999

[54] METHOD AND APPARATUS FOR DETECTING MEMORY DEVICE TYPES

[75] Inventors: Charles N. Shaver, Cypress; Timothy R. Zinsky, Houston; Paul J. Broyles, Cypress; John E. Larson, Houston, all of Tex.

[73] Assignee: Compaq Computer Corporation, Houston, Tex.

[21] Appl. No.: 08/770,611

[22] Filed: Dec. 19, 1996

[51] Int. Cl.$^6$ .................................................. G06F 12/00
[52] U.S. Cl. .................................... 711/105; 711/170
[58] Field of Search ............................. 711/170, 105, 711/106, 171

[56] References Cited

U.S. PATENT DOCUMENTS

| 5,630,163 | 5/1997  | Fung et al.     | 395/307 |
| 5,701,438 | 12/1997 | Bains           | 711/211 |
| 5,706,407 | 1/1998  | Nakamura et al. | 395/86  |
| 5,708,791 | 1/1998  | Davis           | 711/105 |

OTHER PUBLICATIONS

Micron's Technical Note: EDO Compatibility with FPM DRAMs (TN–04–40) May 1996.
Guntram Blohm, RAM quality tier—Is EDO RAM worth it?, www.dejanews.com Nov. 1995.
Dave Tatosian, Detecting EDO RAM with Triton Motherboards, www.dejanews.com Jul. 1995.
Intel 82430FX PCIset Datasheet 82437FX System Controller (TSC) and 82438FX Data Path Unit (TPD), p. 45 Dec. 1996.
Micron, New EDO DRAM, MT4C4007J(S), 1 Meg × 4 DRAM, 5V, EDO Page Mode, Optional Self Refresh, pp. 1–1 through 1–14 (1995).
Micron, FPM DRAM, MT4C1004J(S), 4 Meg × 1 DRAM, 5V, Standard or Self Refresh, pp. 2–1 through 2–14 (1995).
Micron, Technical Note, TN–04–21, Extended Data–Out, pp. 7–36 through 7–64 (1995).
Micron, New Technical Note, TN–04–29, Maximizing EDO Advantages, pp. 7–53 through 7–64 (1995).

*Primary Examiner*—John W. Cabeca
*Assistant Examiner*—Christopher S. Chow
*Attorney, Agent, or Firm*—Akin, Gump, Strauss, Hauer & Feld

[57] ABSTRACT

A memory controller and method of operation for detecting different type of dynamic random access memory (DRAM) devices in a computer system. The memory controller has capabilities for improved page hits which cause the row address strobe signals to remain asserted following certain cycles. A mechanism in the memory controller selectably disables column address strobing. Different DRAM types are distinguishable by reading back data previously written to a memory location. Data is written to memory with a cycle causing the memory controller to keep the row address strobes asserted. Column address strobing is disabled. A read back cycle is performed without column address strobing. If data is present, the DRAM is an extended data output (EDO) DRAM. If data is not present, the DRAM is a fast page mode DRAM.

24 Claims, 20 Drawing Sheets

MEMSM 600

PRECHARGESM FIG. 13

METHOD AND APPARATUS FOR DETECTING MEMORY DEVICE TYPES

BACKGROUND OF THE INVENTION

1. Field of the Invention

The invention relates to detecting the type of memory devices installed in a computer system, and more particularly to a detection algorithm which can differentiate extended data output memory devices from fast page mode memory devices.

2. Description of the Related Art

Computer systems are becoming ever more powerful by the day. Users are requiring more capabilities to run ever more complicated and sophisticated applications and computer system manufacturers are responding. Computer speeds have dramatically increased over the last number of years so that now desktop and file server computers can readily outperform mainframe computers of 10–15 years ago. But the quest for further performance is never ending. To this end, the microprocessor manufacturers have been developing ever faster microprocessors.

However, a computer system is far more than just a microprocessor. There are many other subsystems that must cooperate with the microprocessor to provide a complete computer system. It is desirable to optimize as many of these subsystems as possible and yet take into account cost and system flexibility to satisfy varied user desires.

Two of the subsystems which have not maintained pace with the development of microprocessor are the main memory systems and the input/output buses. Main memory system shortcomings have been much alleviated by the use of cache memory systems, but in the end all memory operations must ultimately come from the main memory, so that its performance is still a key piece in the overall performance of the computer system. Many advanced memory architectures and techniques have developed over the years. One of the most common techniques is the use of paged mode memory devices or dynamic random access memories (DRAMS), where the actual memory address location value is divided into rows and columns, and if the row address, i.e., the page, is the same for the subsequent operation, only the column address needs to be provided to the DRAM. Although there is a certain amount of overhead required, it easily pays for itself by the improved performance gained during a page hit. So basic page mode operation provides a major performance increase, but more performance is always desired.

One further performance increase relates to an improvement for determining the level of the row address strobe or RAS* signal when the memory system is idle. As is well known, the RAS* signal must be negated, or set high, to allow a new page or row address to be provided and there is also a precharge time requirement. Thus, there is a performance penalty if the RAS* signal is raised when the next operation is actually a page hit. Similarly, there is a delay if the RAS* signal is kept low and the operation is a page miss, as the full precharge time must also be expended after the cycle has been issued. To address this concern, various techniques have been developed to predict whether the RAS* signal should be kept low or should be returned high to indicate a new page cycle. The prediction can be done several ways, as indicated in Ser. No. 08/034,104 filed Mar. 22, 1993, entitled "Memory Controller That Dynamically Predicts Page Misses." In that application several techniques are used. A first technique bases the prediction on the type of the last cycle performed by the processor, with the choice always fixed. A second technique samples the hits and misses for each cycle type and then sets the RAS* level based on this adaptive measurement.

Further, personal computer systems are becoming mass market products, and therefore need to be very flexible to meet the widely varying particular goals of users. For example, some users may desire the ultimate in performance with little regard for cost, whereas other users may be significantly more cost sensitive. One area where cost directly impacts performance is in the type of the memory devices used in the main memory.

For many years, fast page mode (FPM) DRAMs have dominated the memory market. Recently, a new type of DRAM called extended data output (EDO) DRAM has become available. The EDO DRAMs have performance improvements over conventional FPM DRAMs which make their use desirable. A distinguishing characteristic of EDO DRAMs is that during a read cycle, the EDO DRAMs provide data output even after the CAS* signals are deasserted. In this way, a CAS* precharge cycle can be performed in parallel with a read cycle, thereby reducing the overall read cycle time. By contrast, in FPM DRAMs, the data outputs of the DRAMs are tri-stated when the CAS* signals are deasserted, or pulled high.

Systems today are being designed to work with both EDO and FPM DRAMs. However, EDO and FPM DRAMs have different timing requirements. It is known that improper use of the DRAMs can cause premature failure. Thus, problems can develop if the DRAMs are installed improperly into a computer system. Users are oftentimes unaware of the subtle differences between EDO and FPM DRAMs, or are unable to identify the type of DRAM. Furthermore, with the computer becoming more user friendly, it is unreasonable to require users to properly configure memory devices. Therefore, it is desirable to automatically detect the type of DRAM present in the computer system.

SUMMARY OF THE INVENTION

A computer system according to the present invention has a memory controller that provides numerous performance increases, particularly in the PCI bus environment, and can readily work with numerous types and speeds of processors and different speed memory devices.

The memory controller of the preferred embodiment is highly programmable for multiple speeds and types of processors and several speeds of memory devices, and yet can be simply programmed. The memory controller includes a plurality of registers that specify the number of clock periods for the particular portions of a conventional DRAM cycle, such as the address set up and hold times, CAS* signal pulse width, the precharge time and the data set up time. These registers are thus consistent with the normal timing concerns and parameters of DRAM devices, so that the designer need only know the particular processor type and clock speed and memory device speed and then the registers can be properly and simply programmed from a small matrix or table. Complex operations and alternatives are not necessary and the clock period values can be easily determined.

Memory locations are determined by writing data to a suspected memory location. Before data is written, caching and refreshing are disabled. Data is written using fast page mode timing. If the same data is read, a valid location exists, otherwise the location is invalid.

Once valid memory locations are determined, memory type is determined by disabling caching and refreshing and configuring the memory controller for fast page mode. A valid memory location is written with known data. Then, a code read operation is performed to the memory location with the memory controller, thereby leaving the RAS* signals asserted. The CAS* signals are then disabled from being asserted. A subsequent memory read operation is performed to the same memory location without the CAS* signals being asserted. If the known data is present on the memory data bus, the device is an EDO type DRAM. If not, the device is a FPM type DRAM. A series of write and read operations may then be used to determine the presence of fast page mode (FPM) or extended data output DRAM devices.

BRIEF DESCRIPTION OF THE DRAWINGS

A better understanding of the present invention can be obtained when the following detailed description of the preferred embodiment is considered in conjunction with the following drawings, in which:

FIG. 17 is a flow digram illustrating a series of steps for detecting a valid memory location according to the preferred embodiment;

DETAILED DESCRIPTION OF PREFERRED EMBODIMENT

The following disclosures are hereby incorporated by reference:

U.S. application Ser. No. 08/324,016, entitled "Single Bank, Multiple Way Cache Memory," by Alan L. Goodrum, Jens K. Ramsey, and Michael J. Collins, filed Oct. 14, 1994;

U.S. application Ser. No. 08/324,246, entitled "Memory Controller With Write Posting Queues for Processor and I/O Bus Operations and Ordering Logic for Controlling the Queues," by Michael J. Collins, Gary W. Thome, Michael Moriarty, Jens K. Ramsey, and John E. Larson, filed Oct. 14, 1994;

U.S. application Ser. No. 08/323,263, entitled "Data Error Detection and Correction System," by William J. Walker and Alan L. Goodrum, filed Oct. 14, 1994;

U.S. application Ser. No. 08/324,020, entitled "Circuit for Invalidating Portions of a Cache Memory if a Write Occurs to a Write Protected Area of Main Memory" by Jens K. Ramsey, filed Oct. 14, 1994;

U.S. application Ser. No. 08/323,110, entitled "Circuit for Placing a Cache Memory Into Low Power Mode in Response to Special Bus Cycles," by Jens K. Ramsey, and Jeffrey C. Stevens, filed Oct. 14, 1994; and U.S. application Ser. No. 08/324,011, entitled "System for Arbitrating Access to Memory" by John E. Larson, Michael Moriarty, Michael J. Collins and Gary W. Thome, filed Oct. 14, 1994; all of which are assigned to the assignee of this invention.

Figure 1:
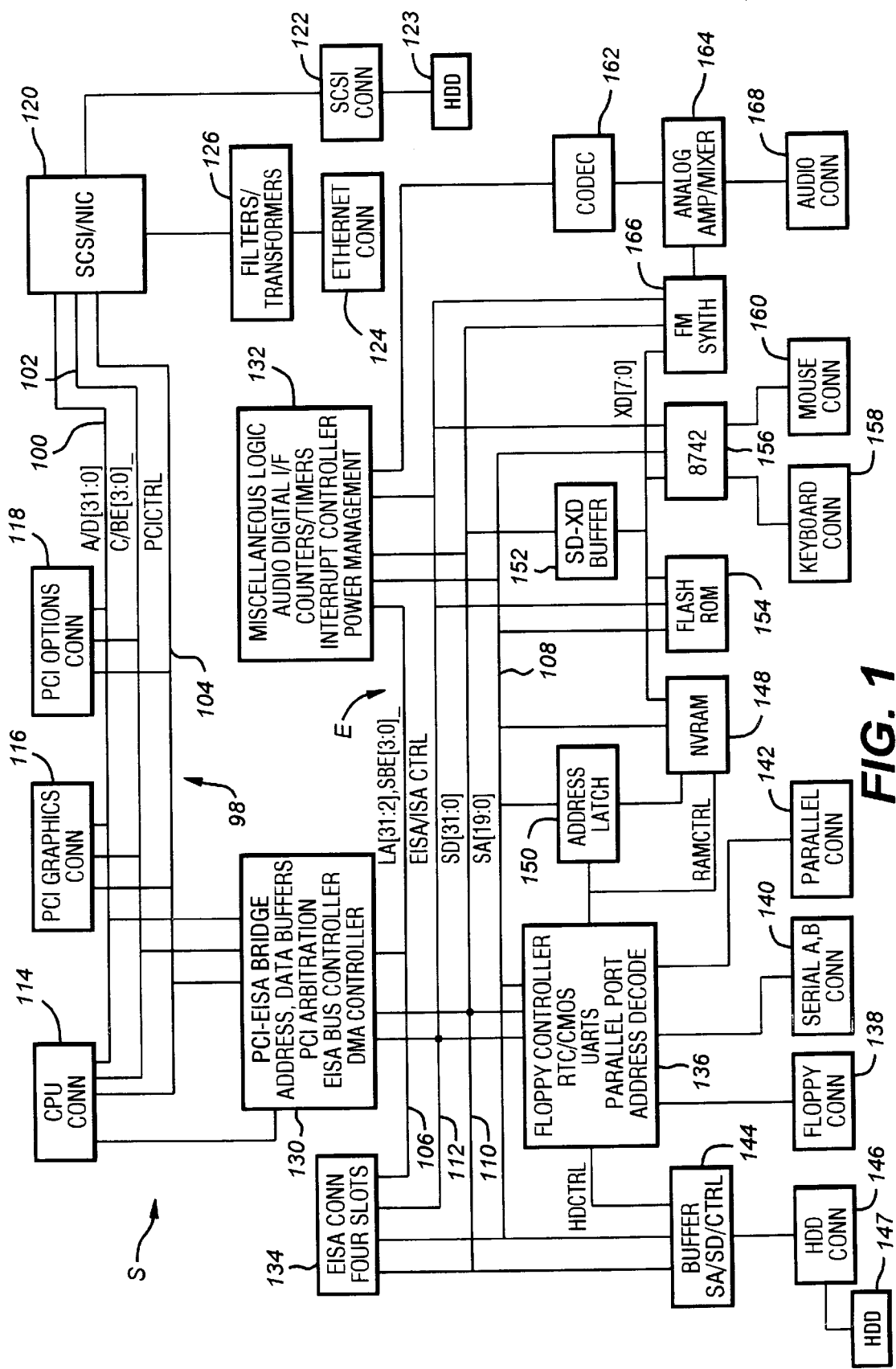
FIG. 1 is a block diagram of a system board of a computer system according to the preferred embodiment.

Referring now to FIG. 1, the system board S of a computer system according to the present invention is shown. In the preferred embodiment, the system boards contain circuitry and slots for receiving interchangeable circuit boards. In the preferred embodiment, there are two primary buses located on the system board S. The first bus is the PCI or Peripheral Component Interconnect bus 98 which includes address/data portion 100, control and byte enable portion 102 and control signal portion 104. The second primary bus on the system board S is the EISA bus E. The EISA bus E includes LA address portion 106, LA address portion 108, SD data portion 110 and EISA/ISA control signal portion 112. The PCI and EISA buses P and E form the backbones of the system board S.

Figure 2:
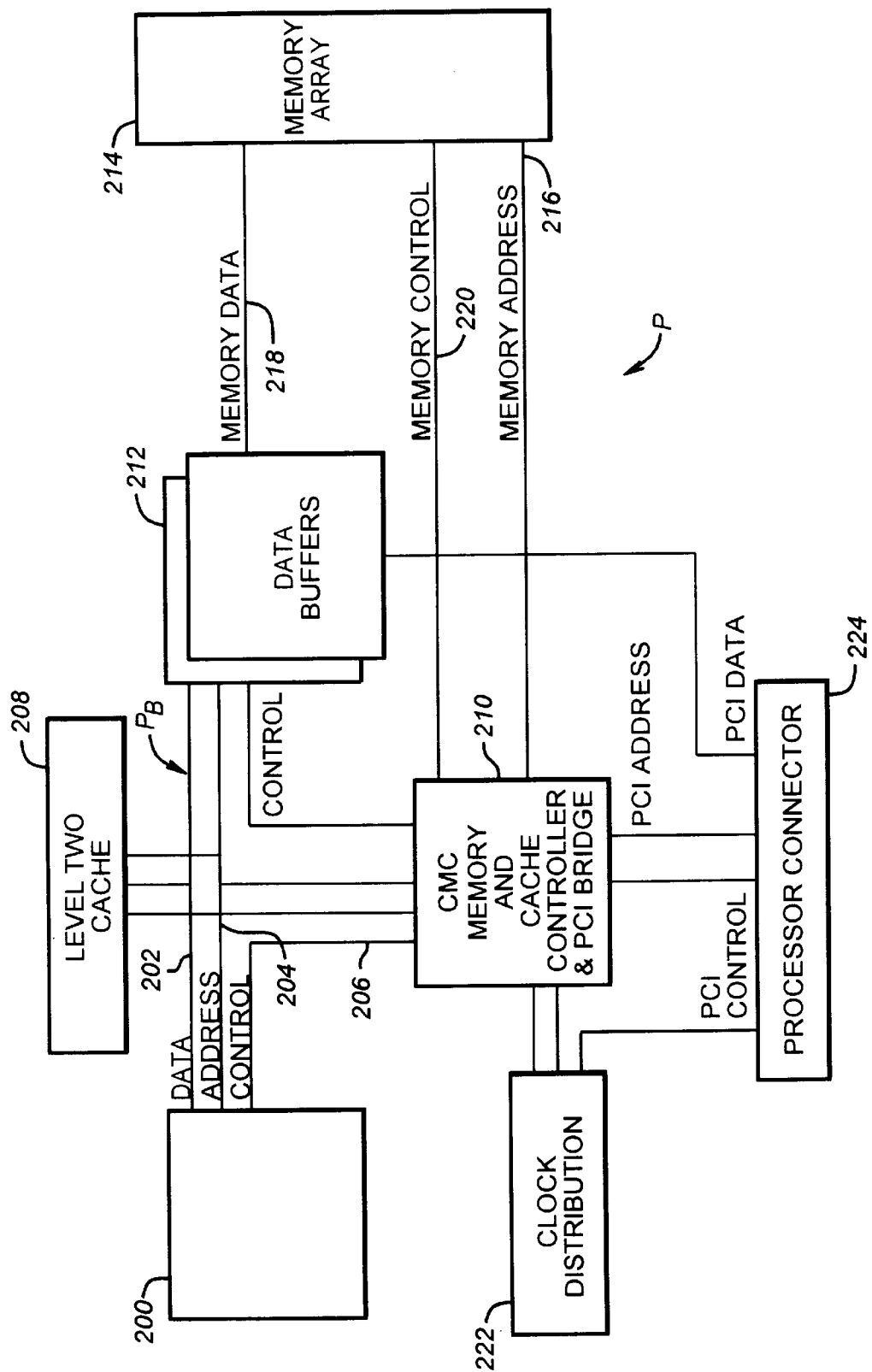
FIG. 2 is a block diagram of a processor board according to the present invention for use with the computer system of FIG. 1.
Figure 3:
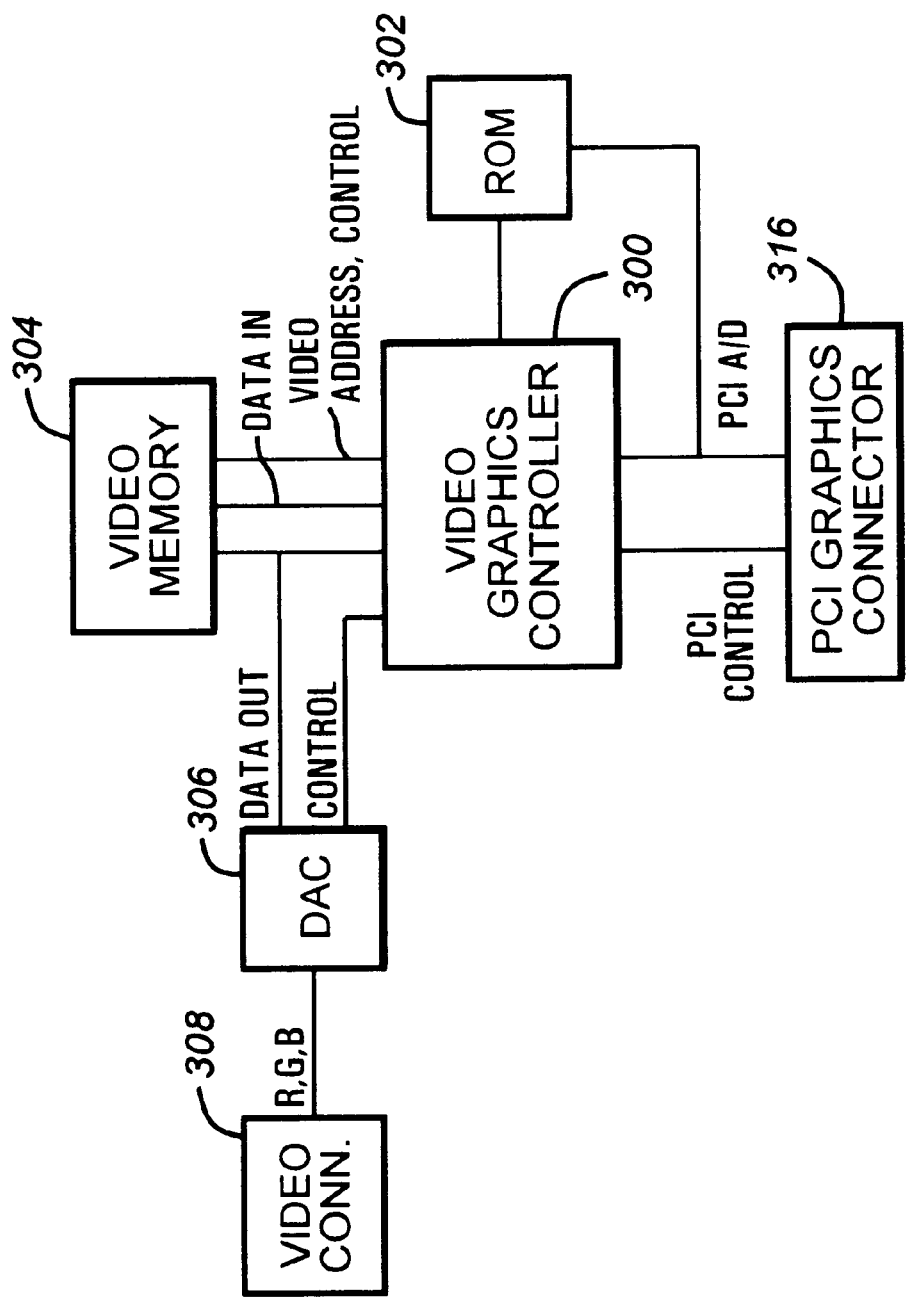
FIG. 3 is a block diagram of a video system for use with the computer system of FIG. 1.

A CPU connector 114 is connected to the PCI bus 98 to receive interchangeable processor cards, such as the one shown in FIG. 2. A PCI graphics connector 116 is connected to the PCI bus 98 to receive a video graphics card as shown in FIG. 3. A PCI option connector 118 is also connected to the PCI bus 98 to receive any additional cards designed according to the PCI standard. In addition, a SCSI and network interface (NIC) controller 120 is connected to the PCI bus 98. Preferably the controller 120 is a single integrated circuit and includes the capabilities necessary to act as a PCI bus master and slave and the circuitry to act as a SCSI controller and an Ethernet interface. A SCSI connector 122 is connected to the controller 120 to allow connection of various SCSI devices, such as hard disk drives 123 and CD-ROM drives. An Ethernet connector 124 is provided on the system board S and is connected to filter and transformer circuitry 126, which in turn is connected to the controller 120. This forms a network or Ethernet connection for connecting the system boards and computer to a local area network (LAN).

A PCI-EISA bridge 130 is provided to convert signals between the PCI bus 98 and the EISA bus E. The PCI-EISA bridge 130 includes the necessary address and data buffers and latches, arbitration and bus master control logic for the PCI bus, EISA arbitration circuitry, and EISA bus controller as conventionally used in EISA systems and a DMA controller. Preferably the PCI-EISA bridge 130 is a single integrated circuit, but other combinations are possible. A miscellaneous system logic chip 132 is connected to the EISA bus E. The miscellaneous system logic chip 132 contains a digital audio interface, counters and timers as conventionally present in personal computer systems, an interrupt controller for both the PCI and EISA buses P and E and power management logic, as well as other miscellaneous circuitry. A series of four EISA slots 134 are connected to the EISA bus E to receive ISA and EISA adapter cards. A combination I/O chip 136 is connected to the EISA bus E. The combination I/O chip 136 preferably includes a floppy disk controller, real time clock (RTC)/CMOS memory, two UARTs, a parallel port and various address decode logic. A floppy disk connector 138 for receiving a cable to a floppy disk drive is connected to the combination I/O chip 136. A pair of serial port connectors are also connected to the combination I/O chip 136, as is a parallel port connector 142. A buffer 144 is connected to both the EISA bus E and the combination I/O chip 136 to act as a buffer between the EISA bus E and a hard disk drive connector 146 to allow connection of an IDE-type hard disk drive 147. A non-volatile random access memory (NVRAM 148 is connected to the EISA bus E and receives its control signals from the combination I/O chip 136. An address latch 150 is connected to the EISA bus E and controlled by the combination I/O chip 136 to provide additional addressing capability for the NVRAM 148. Preferably the NVRAM 148 is used to contain certain system information. A data buffer 152 is connected to the SD portion 110 of the EISA bus E to provide an additional data bus XD for various additional components of the computer system. The NVRAM 148 is connected to the XD data bus to receive its data bits. A flash ROM 154 receives its control and address signals from the EISA bus E and is connected to the XD bus for data transfer. Preferably the flash ROM 154 contains the BIOS information for the computer system and can be reprogrammed to allow for revisions of the BIOS. An 8742 or keyboard controller 156 is connected to the XD bus and EISA address and control portions 108 and 112. The keyboard controller 156 is of conventional design and is connected in turn to a keyboard 158 and a mouse or pointing device 160.

The computer system of the preferred embodiment also includes audio capabilities. To this end a CODEC chip 162 is connected to the miscellaneous system logic chip 132 and to an analog amplifier and mixer chip 164. An FM synthesizer chip 166 is connected to the analog amplifier and mixer 164 and receives digital information from the XD bus. The FM synthesizer 166 is also connected to the control and data portions 110 and 112 of the EISA bus E and is controlled by the miscellaneous system logic chip 132. An audio connector 168 is provided to allow external audio connections to the computer and is connected to the outputs and inputs of the analog amplifier and mixer 164.

Referring now to FIG. 2, the processor board P is shown. In the processor board P of FIG. 2, the CPU or processor 200 can be any of a plurality of processors, such as the 486DX/33, 486DX2/66, 486DX4/50-100, 486DX4/33-100, 486DX4/33-83, P24T, Pentium 50/75, Pentium 60/90, and Pentium 66/100, and other similar and compatible processors. The processor 200 provides data, address and control portions 202, 204 and 206 to form a processor bus PB. A level 2 (L2) or external cache memory system 208 is connected to the processor bus PB to provide additional caching capabilities to improve performance of the computer system. The L2 cache 208 can be organized as a 128 kbyte direct mapped cache or 256 kbyte two-way set associative cache when used with 486 family processor and as a 256 or 512 kbyte direct mapped or two-way set associative cache when used with Pentium family processors. A cache and memory controller (CMC) and PCI bridge chip 210, is connected to the control portion 206 and to the address portion 204. The CMC 210 is connected to the L2 cache 208 as it incorporates the cache controller and therefore controls the operations of the cache memory devices in the L2 cache 208. The CMC 210 is also connected to control a series of address and data buffers 212. The data buffers 212 are utilized to handle memory data to a main memory array 214. The data buffers 212 are connected to the processor data portion 202 and receive control signals from the CMC 210. The data buffers 212 provide a memory address bus 216 and a memory data bus 218 to the memory array 214. A memory control signal bus 220 and memory address bus 216 is provided from the CMC 210. Clock distribution and generation circuitry 222 is associated with the processor card P and is connected to the CMC 210. A processor connector 224, such as a card edge, is provided to be mateably received by the processor connector 114. The processor connector 224 is connected to the CMC 210, the data buffers 212 and the clock distribution circuitry 222 to provide clocks to the computer system and to provide a PCI interface to allow the processor 200 to access the PCI and EISA buses P and E and to allow PCI and EISA bus masters to access the main memory array 214. Through the processor connector 224, the processor can access peripheral storage devices, such as the SCSI device, IDE hard drive 147 and floppy disk drive.

Referring now to FIG. 3, an exemplary video graphics adapter is shown. A video graphics controller 300 is connected to a PCI graphics connector 316, which is mateably received in the graphics connector 116. A ROM 302 is connected to the graphics connector 316 and receives control signals from the video graphics controller 300. Video memory 304 is used to store the graphics data and is connected to the video graphics controller 300 and a digital/analog converter (DAC) 306. The video graphics controller 300 controls the operation of the video memory 304, allowing data to be written and retrieved as required. A video connector 308 is connected to the DAC 306. A monitor (not shown) is connected to the video connector 308.

It is noted that the above description of a computer system is provided for completeness and numerous variations could be developed as apparent to those skilled in the art.

Figure 4:
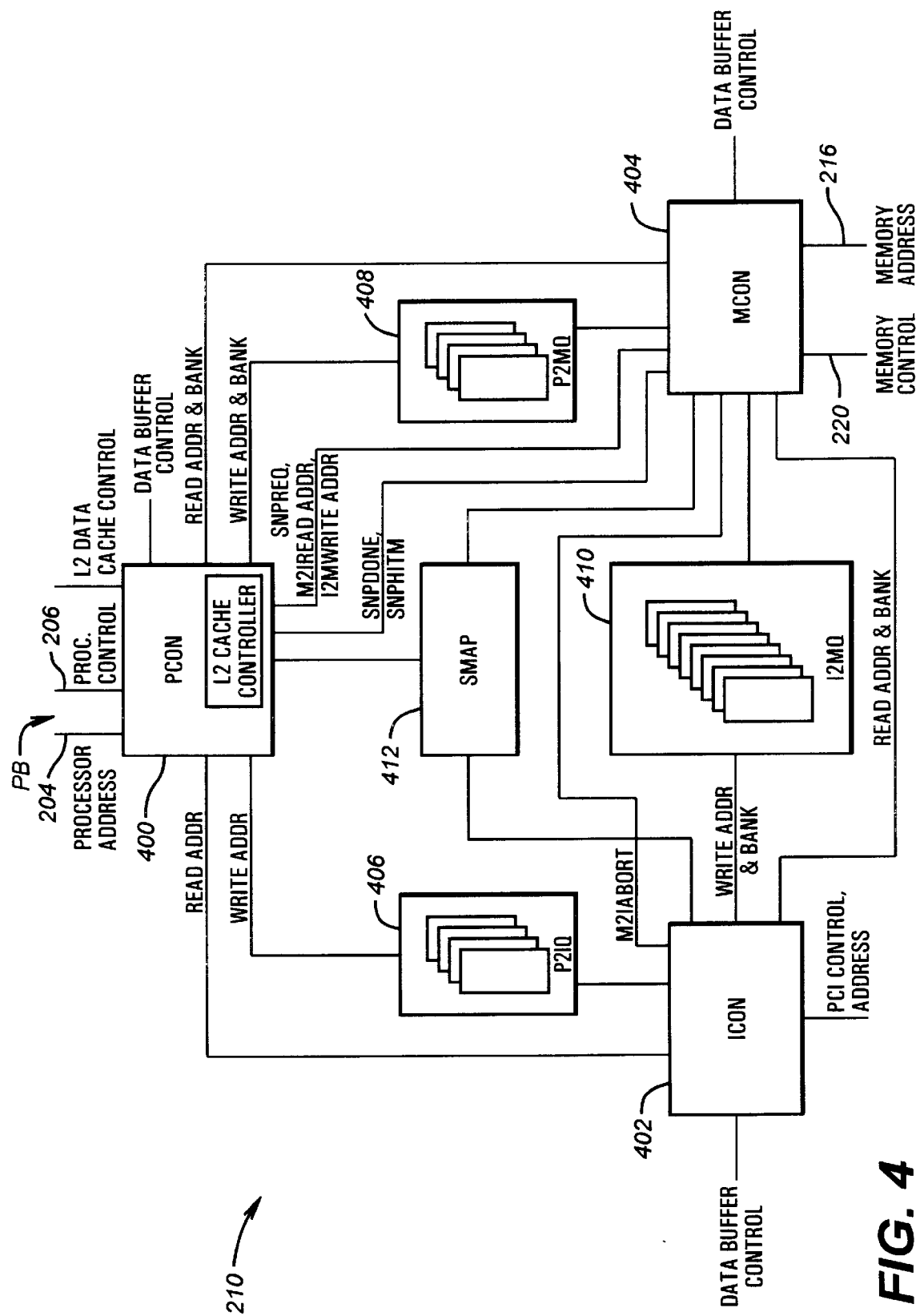
FIG. 4 is a block diagram of the memory controller of the processor board of FIG. 2.

Referring now to FIG. 4, a block diagram of the memory controller 210 is shown. There are three main control blocks in the memory controller 210 and three primary address transfer queues. The three primary control blocks are the processor control or PCON block 400, the PCI control or ICON block 402, and the memory control or MCON block 404. The PCON block 400 provides the interface to the processor bus PB, particularly the processor address bus 204 and the processor control bus 206. Additionally, the PCON block 400 is connected to the L2 data cache 208 and provides the necessary control signals. The L2 cache controller is contained in the PCON block 400. In addition, the PCON 400 provides signals to control the data buffers 212. The ICON block 402 provides data buffer control signals to the data buffer 212 and in addition interfaces to the PCI bus 98, particularly, the control and address portions. The MCON block 404 is the memory device control portion and is connected to the memory address bus 216 and the memory control bus 220, and additionally provides signals to control the data buffers 212. Each of the particular control blocks 400, 402 and 404 control different portions of the data buffers 212 as will be illustrated.

The memory controller 210 and data buffer 212 are effectively organized as a triangle or delta so that data transfer can occur between the processor bus PB and the PCI bus 98, between the processor bus PB and the memory bus, and between the PCI bus 98 and the memory bus. To this end the PCON block 400 is connected directly to the ICON block 402 to provide read addresses for read operations by the processor 200 to the PCI bus 98. The write addresses are provided from the PCON 400 to a P2I queue 406. Preferably, the P2I queue is four operations deep, so that four write operations can be posted to the queue and thus be pending at one time. It is noted that in the case of a 64 bit Pentium microprocessor 200, this would translate to 8, 32 bit PCI bus 98 operations. The output of the P2I queue 406 is provided to the ICON block 402 to provide an address stream. In similar fashion, the read address information and address bank information is provided from the PCON block 400 to the MCON block 404 for processor reads from the main memory 214. The write addresses and bank information are provided from the PCON block 400 to a P2M queue 408, which is again also preferably four quadword addresses deep, so that four write operations from the processor 200 can be posted to the memory array 214 if a Pentium processor and eight operations if a 486-based processor. The output of the P2M queue 408 is provided to the MCON block 404.

The ICON block 402 is connected to the MCON block 404 to provide read addresses and memory bank information for read operations from the PCI bus 98 to the memory 214. In addition, the write address information and bank information is provided from the ICON block 402 to an I2M queue 410. Preferably, the I2M queue 410 is capable of posting eight quadword addresses to provide relatively deep posting from the PCI bus 98 to the memory 214. The output of the I2M queue 410 is connected to the MCON block 404. An SMAP or system map block 412 is connected to the control block 400, 402 and 404 to provide various singles as necessary.

In addition, a signal referred to as M2IABORT is provided from the ICON block 402 to the MCON block 404 to allow the MCON block 404 to determine when a Memory Read Multiple operation has been aborted by the PCI bus master, as well as for other PCI abort operations. For this discussion, only the Memory Read Multiple case is of interest and the other cases will not be discussed. The MCON block 404 provides a snoop request or SNPREQ signal, the M2I read address that is the address for memory to PCI read operations and the I2M write address to the PCON block 400. This allows the PCON block 400 to perform snoop operations with the L2 cache controller and to provide the operation to the processor 200 so that the L1 cache controller inside the processor 200 can also perform a snoop operation. Snooping of read addresses as well as write addresses is necessary because the L2 cache controller, and the L1 cache controller in the processor 200 in certain cases, are preferably organized as writeback cache controllers, and therefore, snoop operations must occur on reads to maintain memory coherency. The PCON block 400 provides the SNPDONE and SNPHITM or snoop done and snoop hit to modified signals to the MCON block 404 to allow the MCON block 404 to proceed with the read or write operations or retry a read operation if appropriate.

Figure 5:
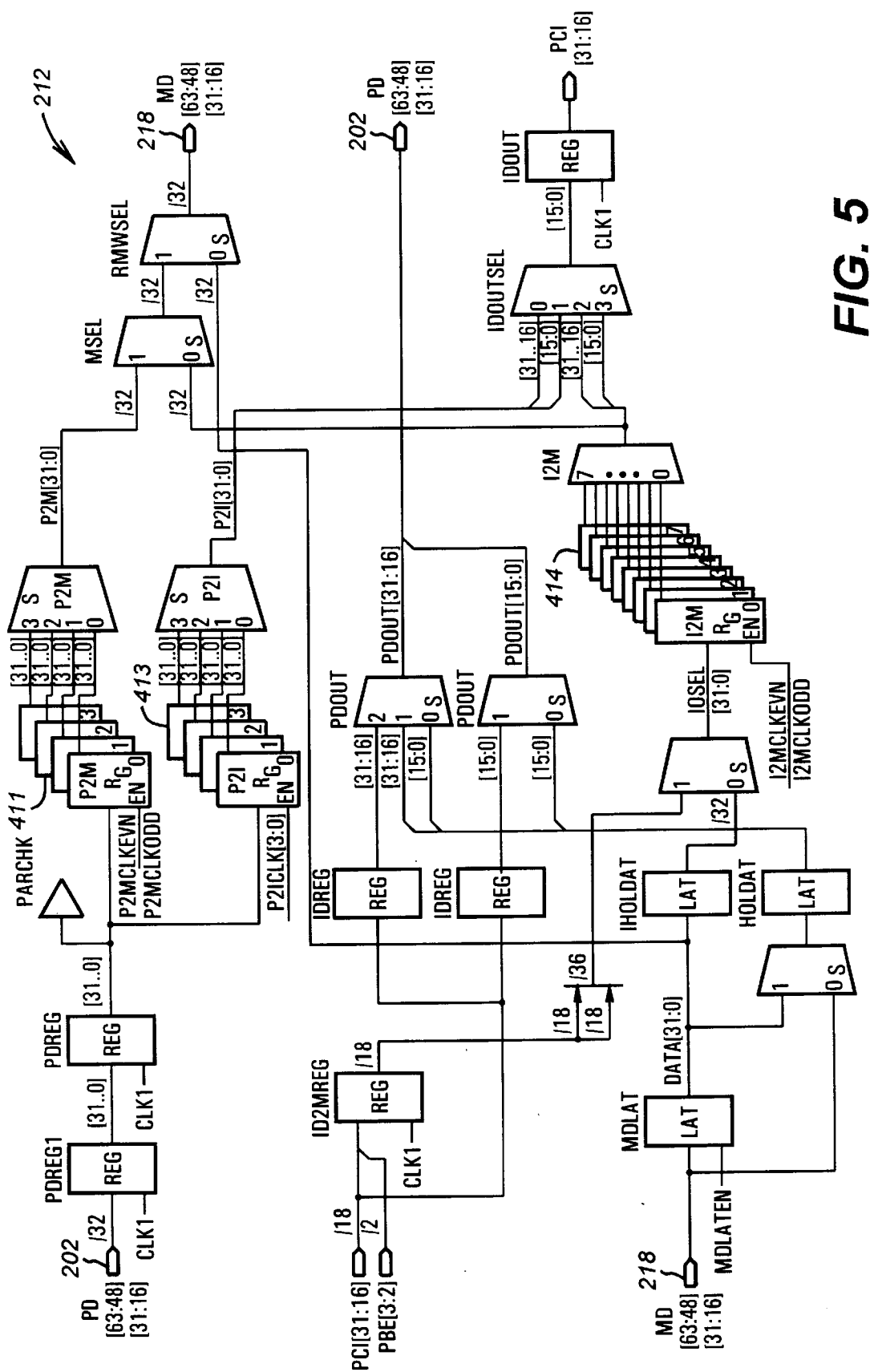
FIG. 5 is a block diagram of the data buffer of FIG. 2.

Referring now to FIG. 5, more details of the data buffers 212 are shown. It can be noted that the data buffers 212 also contain queues 411, 413 and 414 similar to those in the memory controller 210 so that addresses are tracked in the memory controller 210 while the data is maintained and transferred through the data buffers 212. The memory controller 210 is organized to control the data buffers 212 such that the particular control blocks 400, 402 and 404 control their respective portions of the data buffers 212. For example, the PCON block 400 controls the latching of data from the processor data bus into the various registers and the output enable or driving of the data from the memory onto the processor data bus 202. Similarly, the ICON block 402 handles latching of data into the various registers from the PCI bus 98 and the output enables of the data to the PCI bus 98. The MCON block 404 handles the operation of shifting data through the various queues 411, 413 and 414, driving data from the queues 411, 413, 414 to the actual memory devices and latching data as required from the memory devices into either the I2M queue 414 or to registers as provided to the processor data bus 202 and the PCI bus 98. It is noted that the processor to memory and processor to PCI queues 411 and 413 are unidirectional in the data buffers 212 but the PCI to memory queue 414 is operated bidirectionally, that it is used for both write data and the read ahead data. Operation will be clearer according to the description below.

One of the features of the memory controller 210 of the preferred embodiment is that it allows great flexibility in the use of various speed microprocessors and various speed DRAM devices in the memory array 214. Indeed, it allows the memory devices to vary from bank to bank, the main memory array 214 preferably being formed of eight banks or modules. The memory controller 210 of the preferred embodiment allows three different memory speeds to be utilized, with each bank being designated as one of the particular speeds. Each particular memory speed then has a series of parameters relating to timing values as commonly utilized in DRAM specifications. For each particular memory speed, a value to indicate the row address hold time from RAS* is provided, the column address set up times to the CAS* strobe for both reads and writes are provided, the row address set up time to the RAS* signal is provided, as is the memory data set up time to the CAS* strobe and the pulse width of the CAS* strobe. In addition, the RAS precharge time is provided for each memory speed. An indication of when the cycle ready signal is provided to the processor 200 or PCI bus 98 is also indicated as a timing parameter. Preferably, these timing parameters utilize 10 bits of memory in a 16 bit register, the organization shown in Table 1.

TABLE I

| Bits | Description |
| --- | --- |
| 15 | Reserved |
| 14:13 | RAS precharge |
| | 00 = 2 clocks |
| | 01 = 3 clocks |
| | 10 = 4 clocks |
| | 11 = 5 clocks |
| | RAS Precharge defines the number of clocks in which all RAS* signals must be negated (high) before any are allowed to be asserted (low) again |
| 12:11 | MRDY read state |
| | 00 = Assert MRDY in the C1 state |
| | 01 = Assert MRDY in the C2 state |
| | 10 = Assert MRDY in the C3 state |
| | 11 = EDO mode |
| | MRDY read state defines which CAS state MRDY should be asserted for a memory data read. If the CAS pulsewidth is two clocks wide, C2 is skipped. The MRDY state varies on clock frequency and memory speed. |
| 10:9 | Reserved |
| 8 | CAS Pulsewidth |
| | 0 = 2 clocks |
| | 1 = 3 clocks |
| | CAS pulsewidth defines how many clocks CAS* signals must be held asserted. |

TABLE I-continued

| Bits | Description |
|---|---|
| 7:5 | Reserved |
| 4 | MD setup to CAS<br>0 = 1 clock setup time<br>1 = 2 clocks setup time<br>MD Setup Time to CAS defines how many clocks the MD bus must be driven from the data buffers 212 before CAS* is asserted for a write. |
| 3 | Row Address Setup to RAS<br>0 = 1 clock setup time<br>1 = 2 clocks setup time<br>Row Address Setup to RAS defines the number of clocks after the Row Address is generated before RAS* can be asserted for a write cycle. |
| 2 | Column Address Setup to CAS, writes<br>0 = 1 clock setup time<br>1 = 2 clocks setup time<br>Column Address Setup to CAS, writes defines the number of clocks after the Column Address is generated before CAS* can be asserted for a write cycle. |
| 1 | Column Address Setup to CAS, reads<br>0 = 1 clock setup time<br>1 = 2 clocks setup time<br>Column Address Setup to CAS, reads defines the number of clocks after the Column Address is generated before CAS* can be asserted for a read cycle. |
| 0 | Row Address Hold from RAS<br>0 = 1 clock hold time<br>1 = 2 clocks hold time<br>Row Address Hold from RAS defines the number of clocks after RAS* asserts before the Row Address may change. |

Figure 6:
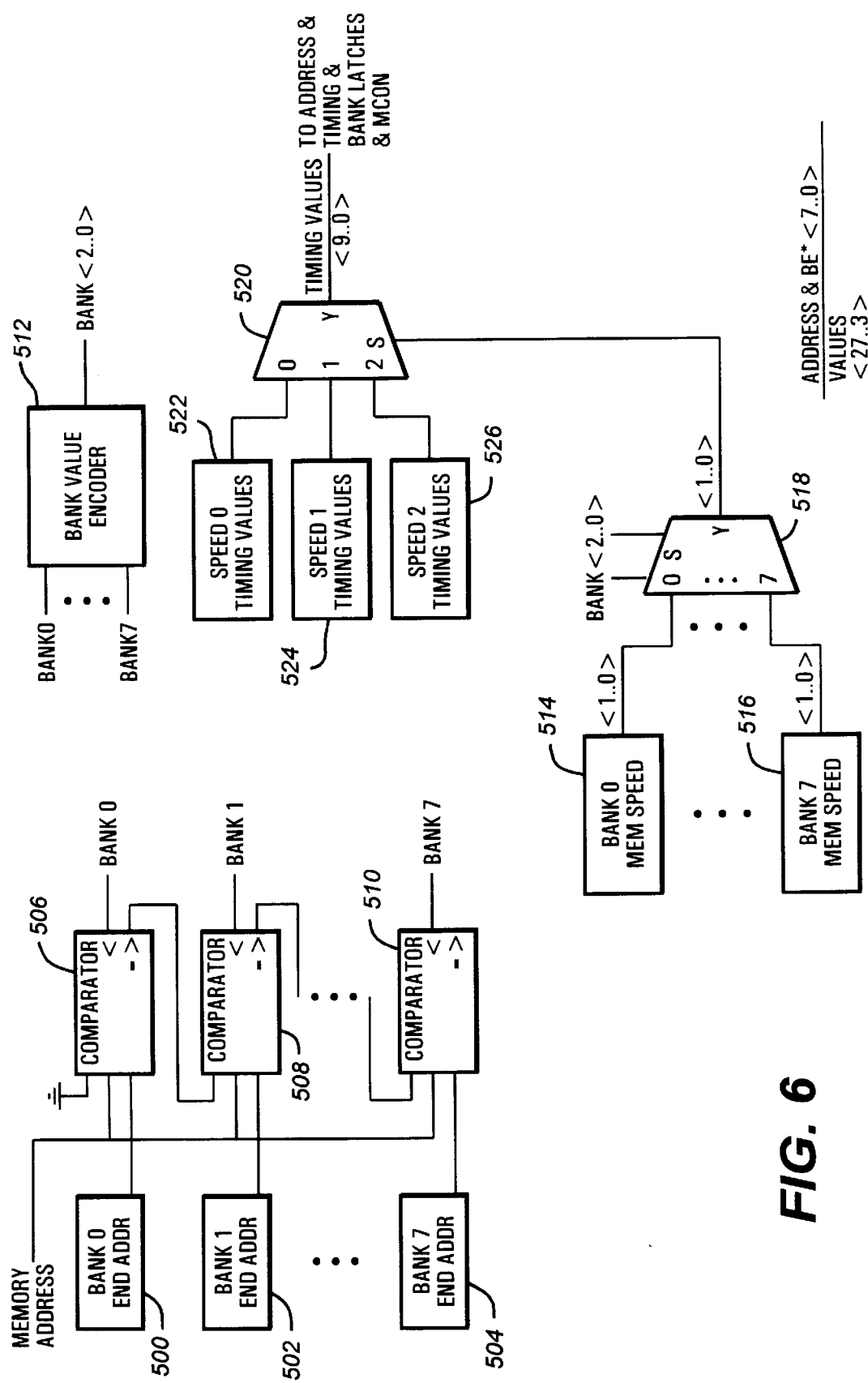
FIG. 6 is a block diagram of the circuitry used to provide memory timing information and addresses for a particular memory cycle in the memory controller of FIG. 4.

Referring then to FIG. 6, each memory bank includes a related register 500, 502 and 504 to indicate the ending address of the particular memory bank. These addresses can be written by the processor 200 after determining the particular size of the memory module located in the particular bank. The output of the bank end address registers 500, 502 and 504 are then provided as one input to comparators 506, 508 and 510. A second input to the comparators 506, 508 and 510 is provided by the memory address of the particular module such as the processor bus PB or PCI bus 98 as appropriate. It is noted that only three of the eight banks are shown for simplicity. The comparators 506, 508 and 510 have two outputs and a third input. One output is the less than output, so that if the provided memory address is less than the ending address of the particular bank, and there is a carry in value to indicate enabling of the comparator, the less than value is true or high, indicating that this is the selected bank. The comparator second output is a greater than or equal to signal, which is used to enable the next comparator. For example, comparator 506 has its greater than or equal to output connected to an enable input of the comparator 508 such that if the memory address is greater than or equal to the address provided in the bank 0 end address register 500, the comparator 508 is activated. If the address is then less than the bank 1 ending address as stored in the register 502, then the output of the BANK 1 signal of the comparator 508 is activated. If the memory address is instead higher, then this chain continues to determine if the memory address is less than that contained in any of the banks. Therefore, there are eight particular bank outputs, BANK 0 to BANK 7, to indicate the presence of the memory address in the particular memory bank.

These BANK 0 to BANK 7 signals are provided to a memory bank value encoder 512, which provides the BANK <2:0> signals, which are stored along with the write address values in the I2M queue 410 or P2M queue 408, for provision to the MCON block 404.

As noted above, each bank could be one of three particular memory speeds, and these indications are contained in registers 514 and 516. Only two registers are shown for simplicity. The outputs of the registers 514 and 516 are two bits to indicate the particular speed, and these bits are provided to the inputs of an eight input, 2 bit multiplexor 518 whose select input is connected to the BANK <2:0> signals. The BANK <2:0> signals are provided with the particular address, be it read or write addresses for the PCON block 400 or the ICON block 402, to the multiplexor 518 so that the output of the multiplexor 518 is the particular two bits that indicate the bank for the particular address for which the MCON block 404 is about to execute the a memory operation. The output of the multiplexor 518 is connected to the select input of a 3 input multiplexor 520. The multiplexor 520 is connected to the registers 522, 524 and 526 which contain the memory speed timing values for speed 0, 1 and 2, respectively. These memory timing values are those indicated in Table 1. The output of the multiplexor 520 is timing values as utilized in the state machines and logic described below for the MCON block 404. In addition, the address values <27..3> and byte enable or BE* <7 ..0> signals are also provided to the MCON block 404 as they have been tracked through the queues 408 or 410 or are provided directly on read operations. Therefore, the memory bank speed timing values are directly provided by first decoding the particular bank, then having a look up for the bank based on the previously defined and stored memory speed value of the optional memory speed settings, and then selecting the particular memory speed values for operation for that particular memory cycle.

An example of the timing values for the preferred embodiment for three processor speeds and two memory device speeds is shown in Table II.

TABLE II

Memory Timing Control Combinations

| | 33 MHz | | 50 MHz | | 60 MHz | |
|---|---|---|---|---|---|---|
| Parameter | 60 ns | 70 ns | 60 ns | 70 ns | 60 ns | 70 ns |
| RAS precharge | 2 | 2 | 3 | 3 | 3 | 4 |
| MRDY assertion state | C1 | C1 | C3 | C3 | C2 | C3 |
| CAS pulsewidth | 2 | 2 | 2 | 2 | 2 | 3 |
| MD Setup | 1 | 1 | 1 | 1 | 2 | 2 |
| Write Column Addr Setup | 1 | 1 | 1 | 1 | 1 | 1 |
| Read Column Addr Setup | 1 | 1 | 1 | 1 | 1 | 1 |
| RA hold | 1 | 1 | 1 | 2 | 2 | 1 |
| Memory Timing Control Register (hex value) | 00_00 | 00_00 | 30_00 | 30_01 | 20_11 | 51_10 |

The DRAM device speeds can be determined by reading encoded bits conventionally provided on SIMMs and checking the size. These two parameters are then used in a lookup table to determine SIMM speed. This technique is described more fully in Ser. No. 08/034,105, filed Mar. 22, 1993, which is hereby incorporated by reference. With the DRAM device speed then known for each bank and microprocessor speed known by other encoded bits, these two parameters are then used in a second lookup table to obtain the binary value to be placed in the timing value register for that continuation. The computer system designer knows the various propagation delays of the various paths and can then simply use the clock speed and memory timing parameters provided by the memory device manufacturer to determine the timing values for each combination.

Figure 7:
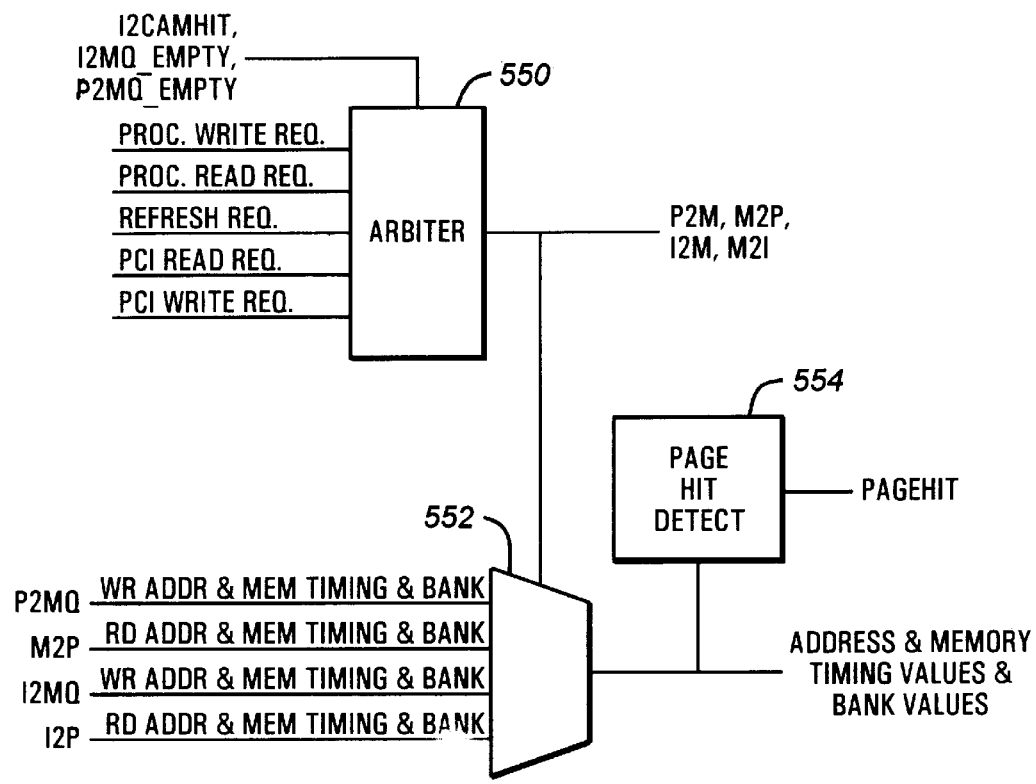
FIGS. 7 and 8 are block diagrams of portions of the memory controller of FIG. 4.

Proceeding then to FIG. 7, the use of the addresses, byte enables and timing values are shown as being provided to a portion of the MCON block 404. The processor write request, processor read request, refresher quest, PCI read request and PCI write request signals are inputs to an arbiter 550 along with signals referred to as I2CAMHIT, I2MQ_EMPTY and P2MQ_EMPTY. The various request signals are an indication that operations are pending for the memory controller to operate on from the indicated sources of the indicated type. Development of these signals is not fully described but can be readily developed by one skilled in the art. The outputs of the arbiter 550 are the P2M, M2P, I2M and M2I signals to indicate which source and direction of operation has occurred, that is P2M for a processor to memory write, M2P for a processor to memory read, I2M for a PCI to memory write operation and M2I for a PCI read operations. These four signals are provided as the select signals to a four input multiplexor 552 which receives the particular read or write addresses, the byte enables, the memory timing values and the bank indications for the particular source. The P2M queue 408 provides write addresses, byte enables, memory timings and bank information from the queue 408 for processor to memory write operations, while the read addresses, byte enables, memory timings and bank information are provided directly for processor reads in the M2P case. Similarly, the I2M queue 410 provides write addresses, byte enables, memory timings and bank information from the I2M queue 410, while the read addressing information is provided directly from the ICON block 402 to the MCON block 404. The output of the multiplexor 552 is the particular address value, the byte enables, the bank value to indicate which particular bank and the memory timing values for the particular memory operation to be performed by the memory controller 210 to access the necessary memory location for either a read or a write as appropriate. It is also noted that a page hit detector 554 is connected to the output of the multiplexor 552 to provide a PAGEHIT signal to allow the memory controller 210 to determine whether a page hit has occurred, so that it can operate the DRAM devices in the desired page mode operation for best performance.

Figure 8:
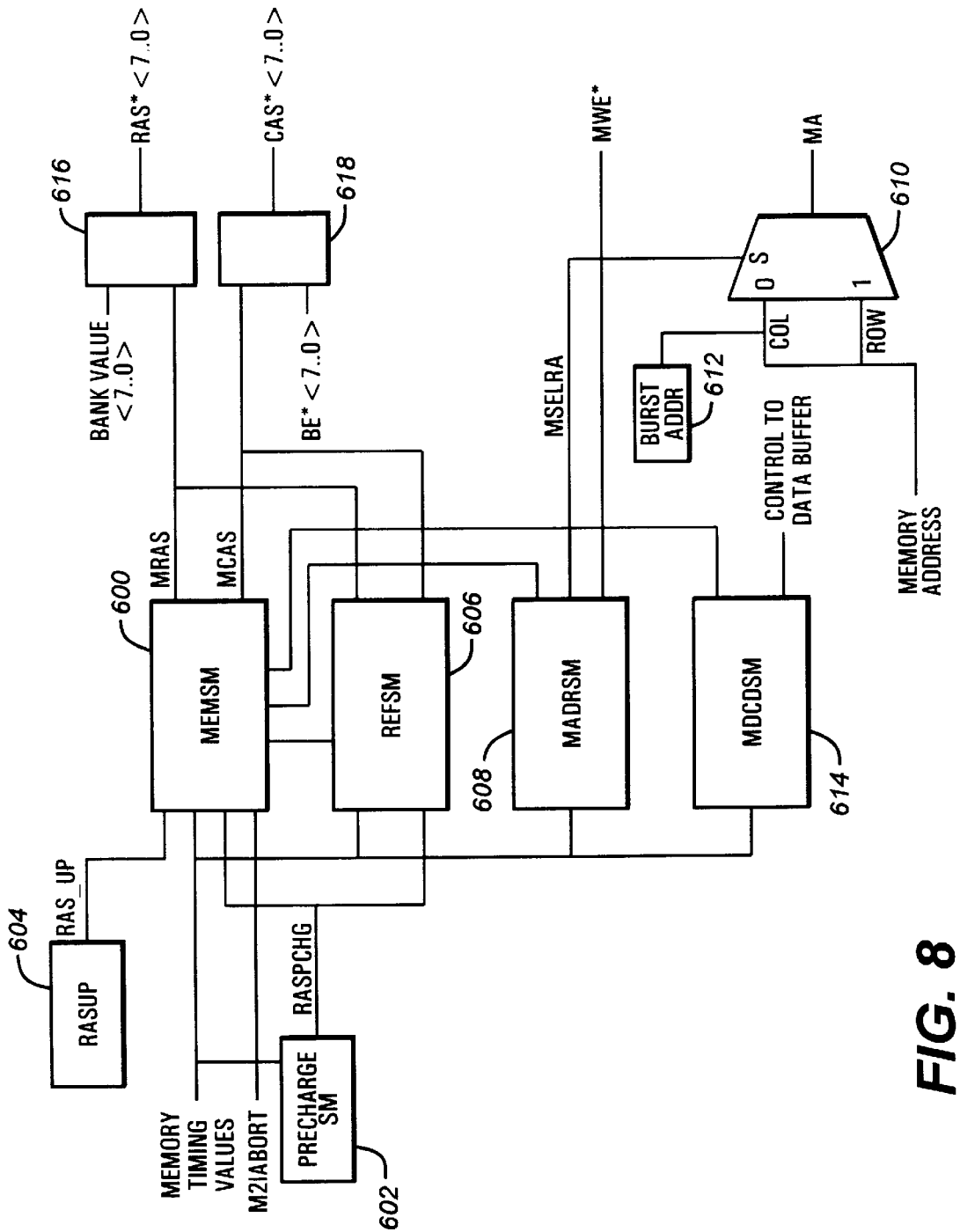

Proceeding then to FIG. 8, blocks representing various state machines and other logic utilized in the MCON block 404 are shown. A number of state machines provide the actual information and control functions and are interlocked. The primary state machine is the MEMSM or memory state machine 600. The memory state machine 600 receives the memory timing values from the multiplexor 552 and the M2IABORT signal from the ICON block 402. A precharge state machine 602 is provided to provide a signal referred to as RASPCHG or RAS precharge to indicate that the precharge time for the particular memory bank is completed if page mode operation is not occurring. The RASPCHG signal is provided to the memory state machine 600. Additionally, RASUP or RAS up logic 604 provides a RAS_UP signal which is utilized by the memory state machine 600 to determine whether to leave the RAS* or row address strobe signal high or low when no memory cycles are pending, thus providing a prediction whether the next operation will be a page hit or page miss to thereby improve performance. Detailed operation of this logic will be described below.

A refresh state machine 606 is provided to control refresh operations but will not be described in detail in this description because its operation is relatively conventional and is omitted for clarity. A memory address state machine 608 receives the timing values from the multiplexor 552, as well as the basic clock signal of the system and provides interlock signals to the memory state machine 600, the MSELRA or memory select row address signal and the MWE* or memory write enable signal. The MSELRA signal is provided to the select input of a 2:1 multiplexor 610 which receives at its inputs the memory addresses appropriately connected to provide row and column addresses based on the selection input. A burst address block 612 is provided and connected to the column addresses to simplify burst operation. The outputs of the multiplexor 610 are the memory addresses provided to the memory array 214 over the memory address bus 216 for the particular operation. The MWE* signal is similarly the memory write enable signal as provided to the main memory array 214. A memory data control state machine 614 is provided. It receives certain of the memory timing values and provides interlock signals to the memory state machine 600 and controls the operation of pertinent portions of the data buffers 212.

The memory state machine 600 provides the MRAS or master RAS and MCAS or master CAS signals. The MRAS signal is combined with the bank value signals for the particular memory operation to provide the RAS*<7:0> signals which are provided to the particular banks. If the bank value indicates that this is the particular bank value for the operation, then the RAS logic 616 directs the MRAS signal to that particular bank in an inverted form. If the bank value is not the one particularly being addressed, then the RAS* signal for that particular bank is held high to allow the memory devices to be fully precharged. The MCAS signal is provided to CAS logic 618 which also receives the BE* <7:0> signals for the preferred 64 bit width. These signals provide the eight byte lanes of information that are encoded with the MCAS signal to produce the CAS*<7:0> signals which are used to enable the particular memory devices of the bank indicated by the RAS*<7..0> signals. If a particular byte enable is not activated, then its related CAS* signal is not activated, and therefore the memory device is not selected as it does not receive a column address. This allows the use of a single MWE* signal, with the CAS* signal providing the byte lane encoding.

The queues 406, 408 and 410 are organized as a series of registers of the appropriate width. Particular registers in each queue are selected based on three particular counter values associated with each queue. The three counters are the read location counter, the write location counter and the data contents counter. The read location counter is utilized to determine the particular location of the four or eight registers from which the read data for the next cycle is to be obtained and provided to the particular block. The write location counter is utilized to indicate the particular register into which data is to be written in the next operation. The read and write location counters increment on each read and write operation, respectively, and thus operate in a circular fashion. The data contents counter is utilized to indicate whether there is actually data in the queue. The data contents counter is an up/down counter. The data contents counter counts up on a write operation to the queue and decrements on read operations. If the data contents counter indicates that the queue is full by being at a maximum value, then data is not written into the queue until data has been removed from the queue. These counters are conventional logic and are not shown for simplicity and clarity. I2MQ_EMPTY and P2MQ_EMPTY signals thus correspond to the data contents counters being at a zero value.

Figure 9:
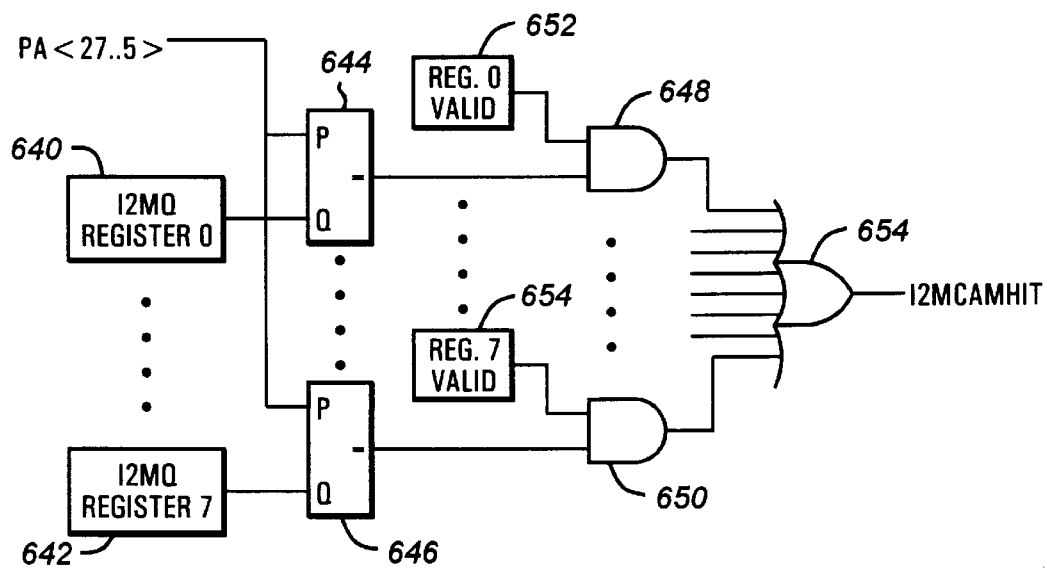
FIG. 9 is a block diagram of the CAM hit detection logic of the memory controller of FIG. 4.

Because of the length of the I2M queue 410, it is organized as a content addressable memory or CAM. I2M queue registers 640 and 642 are shown in FIG. 9, with many omitted for simplicity. The output of the particular register 640, 642 is not only provided to the MCON block 404 via a multiplexer but is also provided to an associated comparator 644 and 646. The second input of the comparator 644 and 646 receives the processor address being provided on the processor address bus 204. The comparators 644 and 646 have equal outputs so that if the address being provided directly on the processor address bus 204 is equal to one of the addresses contained in the I2M queue 410, then the particular comparator provides its equal signal true. The equal signal output goes to one input of an AND gate 648 and 650. The second input to the AND gate 640 and 650 is provided by a valid bit register 652 and 654. If data is not contained in the particular register 640, 642 in the I2M queue 410, then the valid bit register is set to 0, whereas if data is present, then the bit is set to 1. These valid bit registers are set when data is written into the I2M queue 410 and cleared when data is read out of the queue 410. In this manner, if the register is valid and the comparator determines that there is an equality, the output of the particular AND gate is set to a one value to indicate that a hit has occurred. The outputs of the AND gates 648 to 650 are provided to an eight input OR gate 654 whose output is the I2MCAMHIT signal, which is provided to indicate that the particular read address being requested by the processor is actually present in the I2M queue 410 as a write operation from the PCI bus 98, and therefore the memory read request from the processor 200 cannot occur until the particular location has been flushed out of the I2M queue 410. Operation of this delay is seen in the arbiter 550 as described below.

In the preferred embodiment, there are five possible requests for the main memory 214: a processor-to-memory write (P2M), a memory-to-processor read (P), a PCI-to-memory write (I2M), a memory-to-PCI read (M2I), and refresh. A P2M write refers to a write to the memory 214 and a M2P read refers to a read of the memory 214, both initiated by the microprocessor 200. An I2M write refers to a write to the memory 214 and a M2I read refers to a read of the memory 214, both initiated by a PCI bus master. All memory requests from EISA bus masters are passed through the PCI-EISA bridge 130, which includes the necessary logic to be a bus master on the PCI bus 98. Thus, any EISA originated memory request is effectively a memory request asserted by the PCI-EISA bridge 130.

Generally, the priority of the memory requests are as follows, with some exceptions: (1) second refresh request; (2) P2M write request; (3) M2P read request; (4) I2M write request; (5) M2I read request; and (6) first refresh request. The second refresh request indicates that two refreshes are outstanding. When that occurs, the memory controller 234 gives both outstanding refresh requests the highest priority, executing both refresh cycles. The P2M write request is always higher in priority than other memory requests except the second refresh. However, if the I2M queue 410 is full or the I2M queue 410 is not empty and a PCI bus 98 read is outstanding, a signal M_P2M_NOPOST is asserted to prevent further queuing of P2M write requests until a PCI write operation is completed. This allows the P2M queue to clear out, thereby allowing requests from the PCI bus 98 to be serviced. However, assertion of the signal M_P2M_NOPOST does not prevent writeback cycles from being queued, as the writeback may be needed by the PCI memory request.

The M2P read request is always lower in priority than the P2M write request, but it is usually higher in priority than I2M write and M2I read requests. The operation can only occur when the P2M queue 408 is empty. However, an unlocked M2P read request is forced lower in priority than an I2M write request if the M2P read is to the same address as an I2M write pending in the I2M queue. When this occurs, the M2P request remains lower in priority than I2M requests until the I2M write request having the matching address is written to the main memory 214. A M2P read request is also forced lower in priority than an I2M write request if the I2M queue is full. Additionally, if an M2I read request is asserted while an I2M write request is pending, the I2M write request is forced higher in priority than the M2P read request to allow the I2M queue to clear, thereby allowing the M2I request to proceed. Further, an M2I read request is forced higher in priority than the M2P read request if the M2I read has been waiting for the M2P request to negate for more than one arbitration cycle.

The I2M write request is always lower in priority than the second refresh request, the P2M write request, and it is generally lower in priority than the M2P read request with the exceptions noted above. The I2M write operation can only occur when the P2M queue 408 is empty. The I2M write request is always higher in priority than the M2I read request. The I2M write request is held off if the processor is performing a locked access of the main memory 214. Thus, for a locked processor cycle, the exceptions discussed above do not apply to override the higher priority of M2P read requests over I2M or M2I requests.

A locked or atomic access of the main memory 214 is indicated by a signal LOCK* driven by the microprocessor 200. A locked cycle allows the microprocessor 200 to read an address location in the main memory 214 and be assured that the accessed location is not changed by another bus master before the microprocessor 200 writes back to the same memory location. These type cycles are referred to as read modify write cycles. Locked cycles are also generated during other bus transfers, such as during execution of the XCHG (exchange) instruction when one of its operands is memory-based, when updating a segment or page table entry, and when executing interrupt acknowledge cycles.

The M2I read request is always lower in priority than the second refresh request, the P2M write request, and the I2M write request. However, it is higher in priority than the unlocked M2P read request in the instance noted above. The M2I read operation can only occur when the P2M queue 408 is empty.

Finally, the first refresh request is always lower in priority than any of the other requests. However, as noted above, when the second refresh request is asserted, both the first and second refresh requests are executed regardless of whether other requests are pending.

Further details of this arbitration are provided in Ser. No. 08/324,011, entitled "System for Arbitrating Access to Memory" filed Oct. 14, 1994, which is hereby incorporated by reference.

Figure 10:
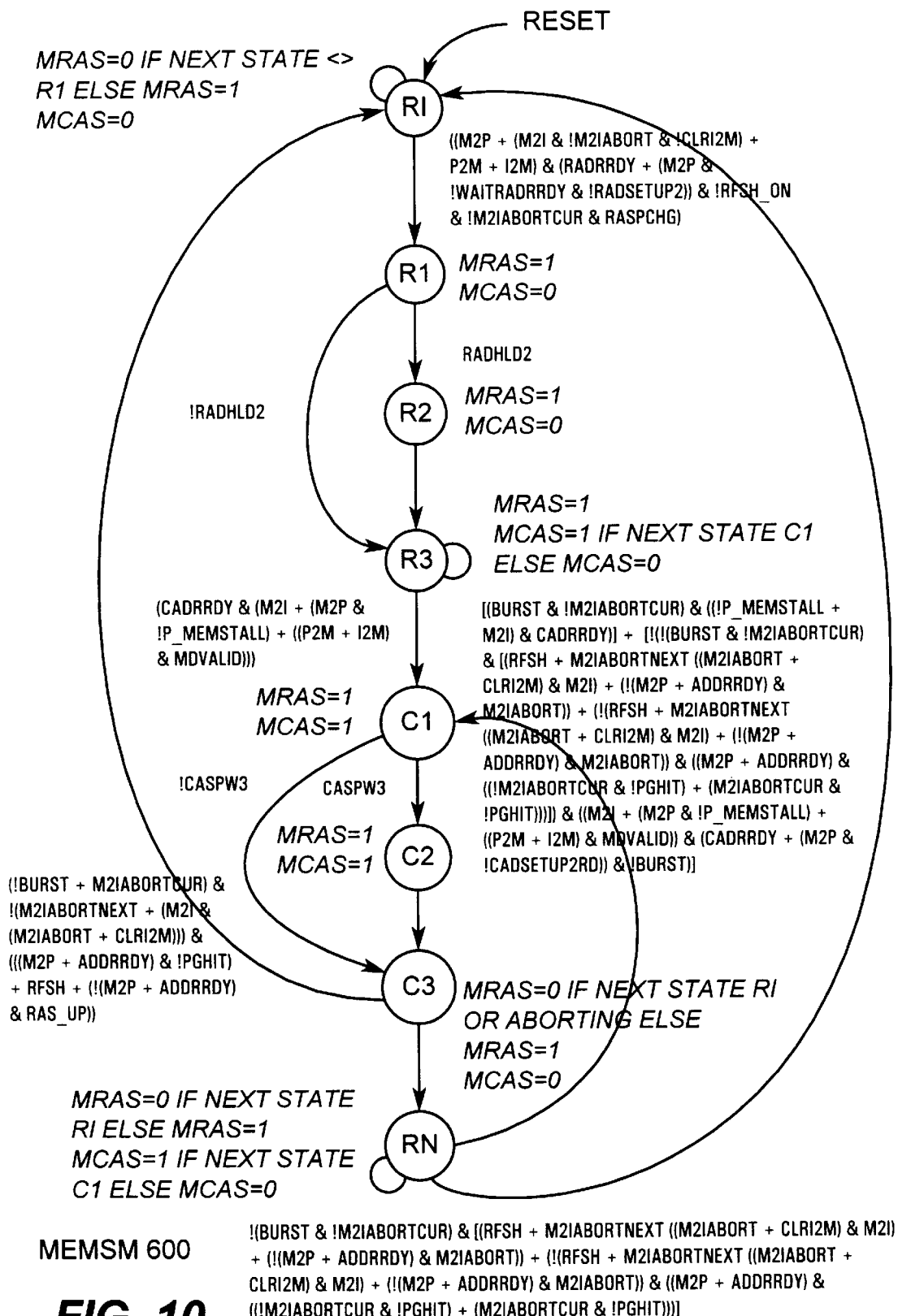
FIGS. 10, 11, 12, 13, 14, and 15 are state machine diagrams for operations of circuitry of various portion of the memory controller of FIG. 4.

Referring now to FIG. 10 the memory state machine 600 is shown in detail. Indications in italics next to a particular state bubble indicate the value of various output signals, developed by the state machine. In this case the MRAS and MCAS signals. The phrases adjacent to an arrow going from one bubble to an other are the logical conditions on which that path is taken. If a path does not have an adjacent logical condition, that path is taken in all other cases. Transitions are made on the rising edge of the processor clock signal. Upon reset of the computer, operation of the state machine 600 transfers to the RI or RAS idle state. In this state the MRAS signal is not asserted if the next state is not state R1. If the next state is R1, then the MRAS signal is set to the value 1 or asserted so that the row address strobe signal is provided. The MCAS signal is negated to a zero level. Control proceeds from state RI to state R1 if the M2P condition is true so that a processor read operation is occurring, if a PCI read operation is occurring (M2I) which has not been aborted (!M2IABORT) and is not being cleared (!CLRI2M), or if a write operation from the processor or the PCI bus is occurring; the row address ready signal (RADRRDY) is true, which indicates that the row address set up time to the RAS signal has been met as indicated by the memory address state machine 608, or, if in a processor read case there is no wait signal indicated as would be appropriate if an aborted memory to PCI read ahead is completing (WAITRADRRDY) and the row address set up time two (RADSETUP2) signal is not activated which indicates that relatively fast memory is present; a refresh cycle is not occurring (RFSH_ON); the current read cycle to the PCI bus 98 is not being aborted (M2IABORTCUR); and the precharge period has completed for as indicated by the RASPCHG signal. The M2IABORT signal is provided by the ICON block 402 as described above. The M2IABORTCUR signal indicates that the cycle currently being performed by the MCON block 404 is to be aborted or terminated as soon as possible. The M2IABORTNEXT signal indicates that the next M2I cycle which is pending is to be aborted, which occurs by simply skipping the cycle. The development of the CLRI2M signal is detailed below, but briefly indicates that a snoop read hit to a modified location has occurred, so that the I2M queue 414 must be flushed and the read cycle reexecuted. Therefore, if a memory cycle is indicated, the row address set up time has been met, and the device is precharged, control proceeds in state RI to state R1. In all other cases control remains at state RI.

In state R1 the MRAS signal is set to 1 or high and true, and the MCAS signal is set low to indicate that this is a RAS only portion of the cycle. Control proceeds from state R1 to state R2 if the RADHLD2 signal is true, which indicates that two clock periods of hold time are required and therefore the intermediate R2 state is required. If the RADHLD2 signal is not true, then only 1 clock of hold time is required from the activation of the RAS* signal and control proceeds directly from state R1 to state R3. In state R2, the MRAS signal is asserted and the MCAS signal is negated. Control proceeds from state R2 to state R3 on the next rising edge of the processor clock signal.

In state R3, the MRAS signal is true or high, while the MCAS signal is set high if the next state is to be state C1 and otherwise the MCAS signal is set low. Control proceeds from state R3 to state C1, the first of the column states, if the column address ready (CADRRDY) signal is true as provided by the memory address state machine 608 to indicate that the particular column address set up time, be it read or write, has been satisfied and either a PCI read operation is occurring or a memory to processor bus read operation is occurring, and the memory operation is not stalled waiting for read data; or a write operation from the processor to memory or the PCI bus to memory is occurring with the data being valid as indicated by the MDVALID signal which is provided by the memory data state machine 614. Therefore, if the column address set up time has been met and indication of write operation data being properly valid for write cases is provided, control proceeds from state R3 to state C1. Otherwise, control remains in state R3 waiting for the timing conditions to be satisfied.

In state C1, both the MRAS and MCAS signals are high to indicate that the CAS portion of the cycle is occurring. Control proceeds from state C1 to state C2 if the CASPW3 or CAS pulse width 3 clock signal is true. If the CASPW3 signal is not true, control proceeds directly from state C1 to state C3, with control always proceeding from state C2 to state C3 on the next rising edge of the processor clock signal. In state C2, the MRAS and MCAS signals are both also true. Thus, state C2 is skipped if the CAS pulse width can be narrower, as would be true for faster memory or slower processors with an additional clock period provided when necessary.

In state C3 the MCAS signal is negated to a 0 level to indicate completion of the particular memory cycle and the MRAS signal is set to 0 if the next state is the RI state or if the particular cycle is aborting. Otherwise, the MRAS signal remains in a high or asserted state to allow operation in page mode if appropriate. Control proceeds from state C3 to state RI if a burst operation is not occurring, which is a preferable operation for 486 and Pentium processors, or the current memory to PCI read cycle is being aborted as explained below; the next memory to PCI read operation is not aborted; there is no indication that the M2I cycle is to be aborted as indicated by the M2IABORT signal or the CLRI2M signal; and a non-refresh cycle is occurring M2P+ ADDRRDY) and this is not a page hit; a refresh cycle is occurring or there is no cycle pending and the RAS_UP signal is true, indicating that the RASUP block 604 has indicated that the prediction is for the next cycle to be a page miss. The RAS_UP signal is generated as follows:

RAS_UP=!(((!WRITEBACK && P2M)||(!MDATARD && M2P)||(!QI2MQEMPTY||&& I2M)||(!M2IABORTCUR && M2IMULREAD && !M2IABORTNEXT) HIT2MOD)

Therefore, the RAS* signal is kept low or in page mode following processor to memory write operations which were not writebacks from the L1 or L2 caches, processor code read operations, PCI bus write operations with pending write operations, Memory Read Multiple operations from the PCI bus 98 which are not being aborted, or hits to a modified address, indicating that a writeback operation has just occurred. In all other cases the RAS_UP signal is true, such that it is considered better to initiate a full new page access to allow precharging to occur during the idle period.

If the conditions for transfer from state C3 to RI are not true, control proceeds from state C3 to state RN or the RAS low idle state. In this state the MRAS signal is low if the next state is state RI otherwise the MRAS signal is asserted. The MCAS signal is asserted if the next state is C1, otherwise the MCAS signal remains in low state. Control proceeds from the RN to C1 state for burst operations in general if the column address set up time has been met and there are no abort operations occurring. Control proceeds from the RN state to the RI state under conditions which generally indicate that the cycle is being aborted or a processor non-burst read which is a page miss is next to occur. In all other cases, control remains at state RN, idling with the RAS* signal low until a cycle needs to be run or an abort or page miss occurs. Therefore, it can be seen that the memory state machine 600 drives the MRAS and MCAS signals based on the timing values of the proper bank, these timing values being variable as indicated above.

Figure 11:
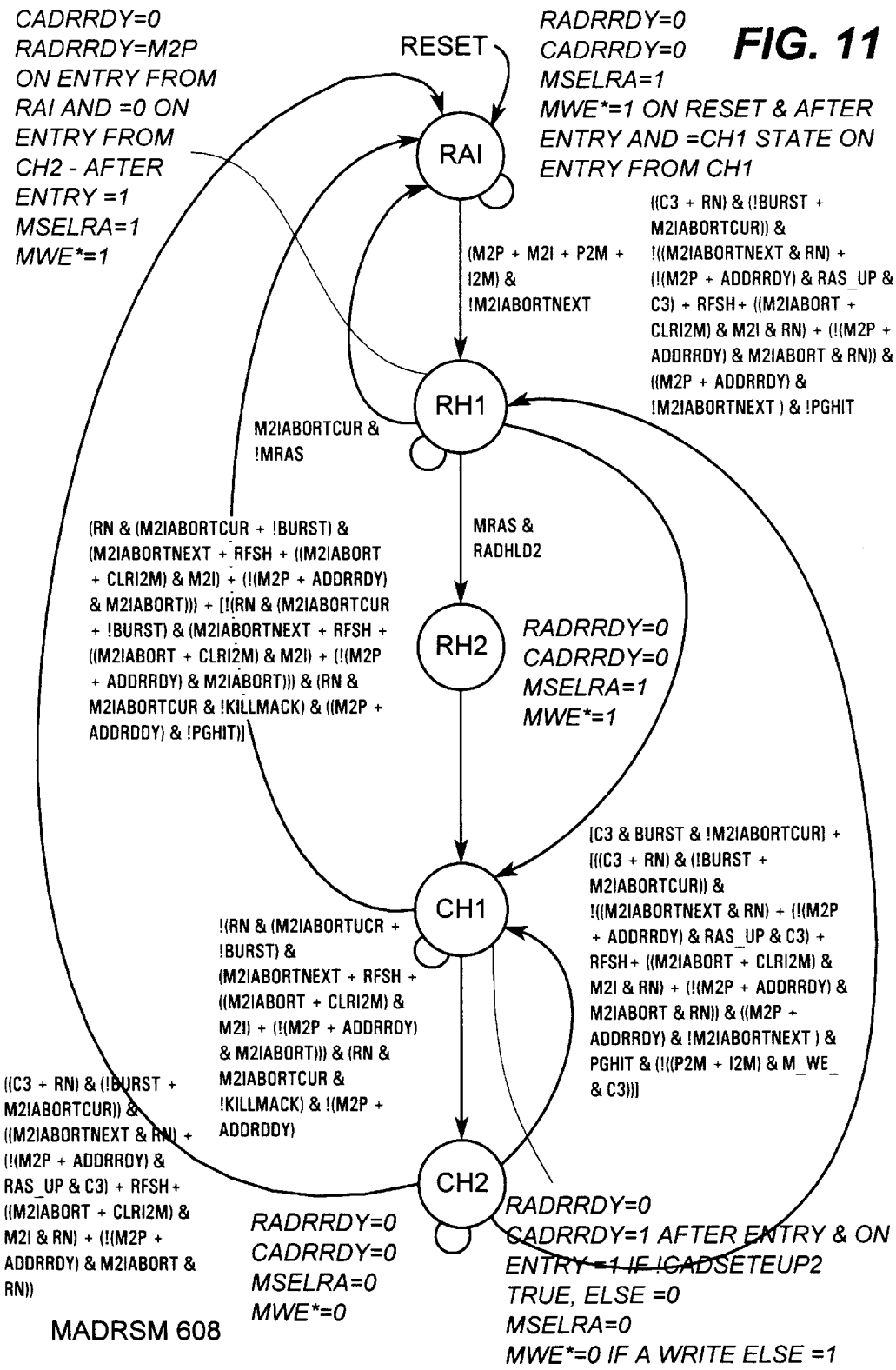

A memory address state machine 608 is shown in FIG. 11. The state machine 608 starts at state RAI upon reset. In this state, the RADRRDY signal and CADRRDY signals are set low to indicate that the row and column addresses are not ready, and the MSELRA signal is set high to initially select the row address to be provided to the memory devices. The MWE* signal is set to 1 or negated level on reset and after entry into the RAI state and is set equal to the CH1 state value the first state after entry from the CH1 state as described below. Control proceeds from the RAI state to the RH1 state if an active cycle is pending from the PCI bus 98 or processor 200 and the next cycle in the read ahead operation is not to be aborted. The current M2I read cycle is aborted under certain conditions, such as receipt of M2IABORT signal or a writeback is occurring, while the next M2I read cycle is aborted when the M2INA signal has been received but the cycle not started when the M2IABORT signal is received. In all other cases control loops at state RAI.

In state RH1 the CADRRDY signal is set low and the RADRRDY signal is set to the value of M2P or memory to processor read upon entry from the RAI state, is equal to 0 on entry from the CH2 state as defined below and after entry into the RH1 state is set to a 1 level. The MSELRA and MWE* signals are set to high levels so that the row address is selected and a write operation is not indicated. Control proceeds from the RH1 to the RH2 state if the MRAS signal is true from the memory state machine 600 and the RADHLD2 signal or row address hold time signal is set to indicate slower memory devices. If the MRAS signal is true and the RADHLD2 signal is not set, control proceeds from the RH1 state directly to state CH1, which is also where control proceeds on the next clock signal in the RH2 state. In all other cases, operation loops at the RH1 state. In the RH2 state, the RADRRDY signals and CADRRDY signal are set low, and the MSELRA and MWE* signals are set at high state. Control proceeds from the RH2 to the CH1 state.

In the CH1 state, the RADRRDY signal is low to indicate that the row address set up time has not been met. The CADRRDY signal is set to a high or true value after initial entry into the state. On entry the CADRRDY signal is set high if short CAS address setup times were set (!CADSETUP2) for the read or write as appropriate, and otherwise is set low. The MSELRA signal is set to 0 to indicate that the column addresses are selected and the MWE* signal is low if a write operation is occurring.

Control proceeds from the CH1 state to the RAI state if the memory state machine 600 is in state RN and either the cycle is aborting or a processor read page miss is pending. Control proceeds from the state CH1 to state CH2 if the memory state machine is not in state RN or the cycle is not aborting completely or the processor read cycle is a page hit. In the CH2 state the RADRRDY and CADRRDY signals are set low to indicate that no addresses are ready. The MSELRA signal is set low and the MWE* is set low to indicate the write operation is occurring and the column addresses are provided. Control proceeds from the CH2 state to the CH1 state for ongoing burst cycles when the memory state machine is in state C3 or for pending processor read page hit operation. Control proceeds from the CH2 state to the RAI state if the cycle is aborting or if an idle condition is present and the RAS* signal is to be set high. Control proceeds from the CH2 to the RH1 state if a processor read page miss operation is to occur and the memory state machine 600 is at the end of a cycle.

Therefore the memory address state machine 600 properly provides the MWE* signal for the DRAM devices and controls the address multiplexor 610. In addition, the RADRRDY and CADRRDY or row and column address ready signals are provided to the memory state machine 600 based upon the column and row address set up times as provided in the memory timing registers.

Figure 12:
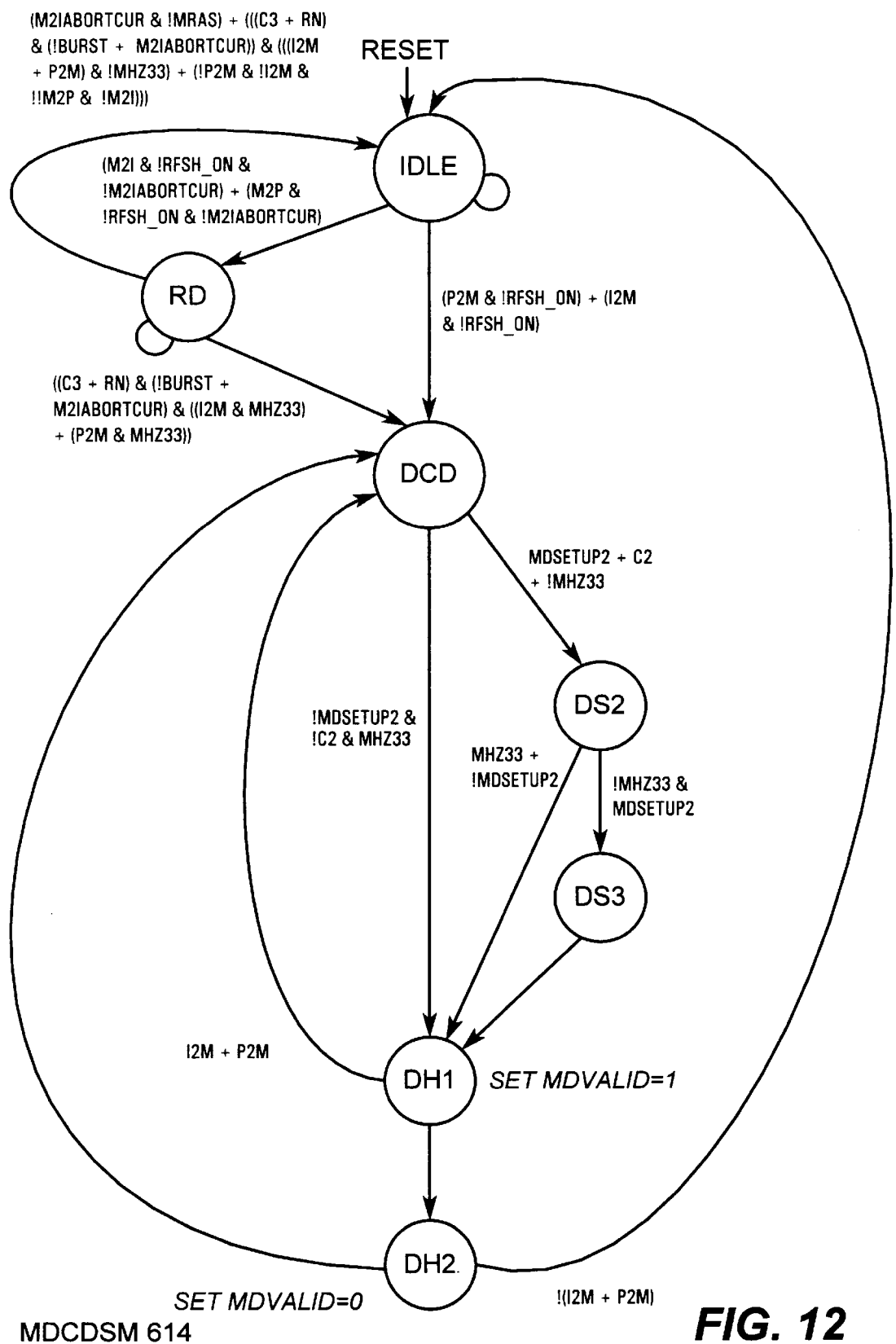

The MD or memory data state machine 614 is illustrated in FIG. 12. The state machine 614 starts at the IDLE state upon reset. Control proceeds from the IDLE state to a RD state for processor or PCI bus 98 read operations which are not being aborted and refresh is not occurring. Control proceeds to the DCD state if a processor to memory write operation is occurring and there is no refresh or if a PCI bus to memory write operation is occurring and again there is no refresh. Control otherwise remains at the IDLE state. Control proceeds from the RD state to the DCD state if the memory state machine is in states C3 or RN, the cycle is either being aborted or is not a burst cycle and it is a write operation with a 33 MHz processor. Control proceeds from the RD state to the IDLE state if MRAS is negated and the cycle is aborting or the memory state machine is in states C3 or RN, the cycle was not a burst or is aborting, and a non-33 MHz processor write operation or PCI bus 98 write cycle is pending or no cycles are active. In all other cases, control remains at state RD.

Control proceeds from the DCD state to the DH1 state if the MDSETUP2 signal is not true, indicating that this is a fast memory data set up case, and the memory state machine 600 is not in state C2 and 33 Mhz operation is indicated for the processor. In all other cases, control proceeds from the DCD state to the DS2 state. Control proceeds from the DS2 state to a DS3 state if the processor 200 is not operating at 33 Mhz and the MDSETUP2 signal is set to a DS3 slower memory data set up times. Control proceeds from the DS2 to DH1 states in all other cases. Control proceeds from the DS3 state to the DS1 state on the next rising edge of the clock signal.

In the DH1 state, the MDVALID signal is set to 1 or asserted to indicate that the memory data set up time to the column address strobe has been met. This allows the memory controller state machine 600 to proceed to state C1. Control proceeds from the DH1 state to the DCD state if further write operations are pending and otherwise proceeds to the DH2 state. In the DH2 state, the MDVALID signal is set to 0 to indicate that the memory is no longer valid. The value of the MDVALID signal is not changed in any states other than the DH1 and DH2 states, except it is cleared on reset. Control proceeds from the DH2 state to the IDLE state if no write operations are pending from the PCI bus 98 or from the processor 200. In all other cases, control proceeds from the DH2 state to the DCD state. In this manner, the memory data state machine 614 provides the MDVALID signal to the memory state machine 600 when the memory data is properly set up.

Figure 13:
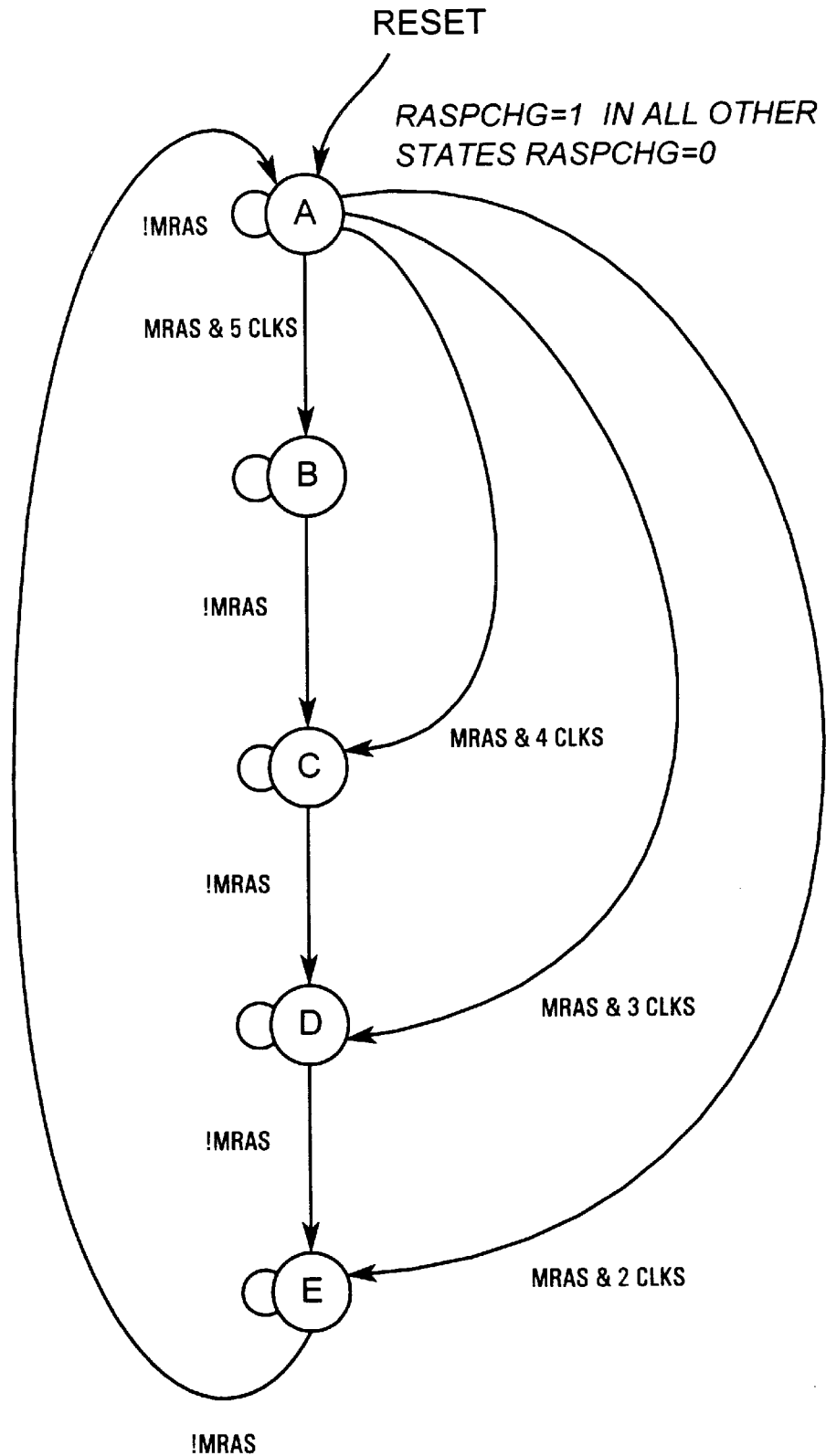

The precharge state machine 602 is shown in FIG. 13. Upon reset, the state machine 602 operation commences at state A. Control remains in state A when the MRAS signal is not asserted. When the MRAS signal is asserted, control proceeds to one of states B, C, D, or E, dependent upon the number of clocks defined for the precharge time. Control proceeds to state B for five clocks, to state C for four clocks, to state D for three clocks and to state E for two clocks. Control proceeds from states B to C to D to E, sequentially, when the MRAS signal is not asserted. Otherwise, control remains in each particular state. Control then proceeds from state E back to state A when the MRAS signal is deasserted. Therefore the precharge state machine 602 leaves state A upon the commencement of a particular memory operation and then does not begin traversing the remaining states until the MRAS signal has been negated, so that a precharge period has started. It is noted that this results in the proper precharge time for any given bank, even if banks are being switched in sequential memory operations if refresh operations are ignored. This occurs because, as noted above, when a particular bank is not selected the RAS* signal for that bank is set high so that it is in a precharge period. Thus if the bank is not selected, it has been through at least one full memory cycle of precharge, which is sufficient to provide the required recharge in all cases. Thus, the precharge time is set for that of the particular memory bank on which the current cycle is operating, so that if back to back cycles occur on that particular memory bank, the memory devices are properly precharged.

However, refresh operations somewhat degrade this operation as it is not known in the preferred embodiment which bank will be requested after a refresh cycle, so to simplify the design of the preferred embodiment, the precharge value for all of the DRAM types is set to the worst case by the initialization or POST software. This reduces performance in certain cases but simplifies the design. A slightly more complicated design would use the worst case value, preferably provided to a predetermined register for only the first precharge operation after a refresh cycle and thereafter operation would revert to the optimal timing for each bank.

Figure 14:
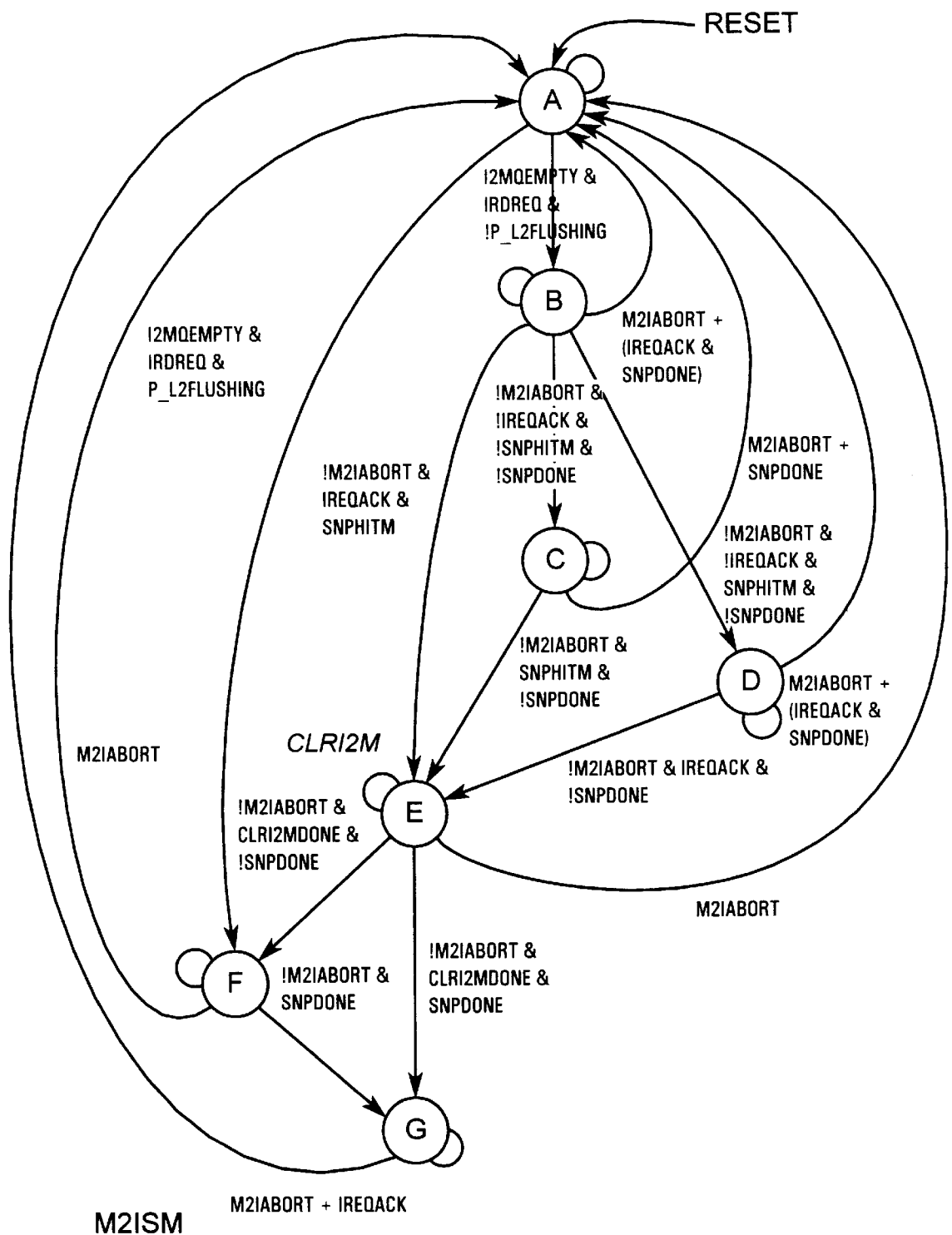

Write addresses and data traverse through the I2M queues 410 and 414 based on having posted data and the arbiter 550 providing access to the queues 410 and 414 by the memory system. The write addresses are provided to the PCON block 400 when placed in the I2M queue 410, to allow the PCON block 400 to control snooping of the address by the L1 and L2 cache controllers. Read operations occur in a different fashion than write operations. Read addresses are provided to the MCON block 404 along with an indication that a read request has issued. The read addresses are provided based on a return of an L2 cache line, which is 4 32 bit words for 486 microprocessors and 8 32 bit words for Pentium processors. Therefore, when an M2I read is requested, four or eight 32 bit words are provided, with the ICON block 402 properly providing the data from the read operation to the PCI bus 98 as required. The read request indications are provided by a memory to PCI next address state machine described below. The read request is also provided to the arbiter 550 for arbitration and to the PCON block 400 to allow L1 and L2 cache snooping with a writeback in case of a hit to a modified line. When the arbiter 550 provides the approval to proceed with the PCI bus 98 read, the MCON block 404 then proceeds to process the information. It is noted that this will have occurred only after the I2M queues 410 and 414 are emptied of any pending write operations so that the I2M data queue 414 provided in the data buffer 212 can be utilized to do a block read operation of the lengths indicated. Therefore, when the I2M queues 410 and 414 are emptied, the read operation commences and is controlled by an M2I state machine as shown in FIG. 14. The state machine commences at state A upon reset. Control then proceeds to state B if the I2M queue 414 is empty, a read is requested and the L2 cache 208 is not being flushed. This would be a normal read condition. If instead, the L2 cache 208 is being flushed, control then proceeds from state A to state F, assuming that the I2M queue 414 is empty and the read request is present. Otherwise control remains at state A waiting for the read operation to be initialized.

From state B, control proceeds to one of four different states. Control returns to state A if the M2IABORT signal has been received, indicating that the PCI bus master has aborted the read operation, or if the IREQACK signal is true, which indicates that the next operation as determined by the arbiter 550 will be a PCI read, and the SNPDONE signal is true indicating that the PCON block 400 has completed snooping the read operation address to the level 2 cache and to the level 1 cache in the processor 200. Control proceeds from state B to state C if the M2IABORT signal is not asserted, the next cycle is a PCI read as indicated by the REQACK signal being asserted, there has not been a snoop hit to a modified (SNPHITM) location as indicated by the PCON block 400 and the snoop operation has not been completed, as also indicated by the PCON block 400. This will be the case where a read operation has been requested and has been arbitrated but may have to be aborted because the snoop operation has not been performed and a hit to a modified location may yet occur. Control proceeds from state B to state D, if the operation is not being aborted and a PCI read has not been arbitrated, but there has been a snoop hit to a modified location with the writeback operation not yet completed. Control proceeds from state B to state E if the cycle is not aborted, has been arbitrated as indicated by the IREQACK signal and there has also been a snoop hit to a modified location, so that a writeback operation from the appropriate cache controller will be occurring. In all other cases control remains at state B.

Control proceeds from state C back to state A if the cycle is being aborted or if the snoop is completed without being a hit to a modified location. Control proceeds from state C to state E if the cycle is not aborted and there has been a snoop hit to a modified location. Otherwise, control remains at state C until the snoop operation is completed, the cycle is aborted or there is a snoop hit to modified. Control proceeds from state D back to state A if the operation is aborted or upon indication that the PCI cycle is next for operation and the snoop has completed. This would occur after the writeback has been completed and then the PCI operation is next to occur, as the write back will have superseded the PCI operation. Control proceeds from state D to state E if it is not being aborted, the PCI request is next and the snoop has not been fully completed. Otherwise control remains at state D.

In state E, the CLRI2M signal is set to indicate to other portions of the memory controller 210 that because of the writeback, the data in the I2M queue 414 must be flushed and discarded. A CLRI2MDONE signal indicates this flushing has been completed. Control proceeds from state E to state F if the cycle is not being aborted and the signal CLRI2MDONE or clear the queue done signal is true and the snoop is not yet completed. Control proceeds from state E to state G if the cycle is not being aborted, the clearing of the queue 414 has been completed and snoop has been performed. Control proceeds from state E to state A if the cycle is being aborted and in all other cases remains at state E.

Control proceeds from state F to state G if it is not being aborted and the snoop cycle has been completed. Other control proceeds from state F back to state A if the cycle is being aborted. Otherwise control remains at state F. Control proceeds from state G back to state A if the cycle is aborted or if it is next in line as indicated by the REQACK signal.

Therefore, the M2I state machine controls transfer of information from the memory to the PCI interface using the I2M queue 414 located in the buffer 212. Data is not transferred until the queue 414 is cleared of any write data and then proceeds only based on snoop information and when the arbiter 550 allows it to proceed.

As noted above, the design of the preferred embodiment performs read ahead operations when a PCI Memory Read Multiple operation has been received. The operation proceeds as follows. The ICON block 402 receives a Memory Read Multiple cycle form the PCI bus 98 and when there is room in the I2M queue 414 issues an M2I read cycle request, along with an address, to the MCON block 404. The MCON block 404 arbitrates as described above and ultimately starts on the M2I read request. When it has started the operation, it provides a next address or M2INA signal to the ICON block 402 and provides the data to the I2M queue 414 along with the appropriate ready signals. The ICON block 402 knows a Memory Read Multiple command is occurring and issues another M2I read cycle request at the next address when the M2INA signal is received and the I2M queue 414 can receive another cache line of data. The ICON block 402 also receives the ready signals from the MCON block 404 and provides the data to the PCI bus 98. The MCON block 404 receives the M2I read cycle request and executes it when the cycle wins the arbitration. Conventionally this will be before the ICON block 402 has removed all of the data from the I2M queue 414 for the initial read request. The MCON block 404 then commences the read request and issues another M2INA signal. The MCON block 404 then provides the data to the I2M queue 414. The ICON block 402 receives this M2INA signal and again checks to see if there is space available in the I2M queue 414 to receive another cache line. When there is room because the ICON block 402 has provided sufficient data to the PCI bus 98, the next M2I read request is provided to the MCON block 404. This process continues until either the Memory Read Multiple completes, a page boundary is crossed or the PCI bus master aborts the cycle.

The abort case is the one of interest as the pending read ahead operation is terminated as soon as possible to save retrieving the entire cache line. This can be seen in the discussions of the MEMSM 600, the MADRSM 608, the MDCDSM 614 and the M2I state machine. This quick termination is seen in the MEMSM 600 as the return to the RI or C1 states from the C3 and RN states, so that the cycles finishes as soon as the current individual read operation is completed, thus potentially before the completion of the full cache line read. Similarly the MADRSM 608 returns to the RA1 state if a cycle has not started or when the column addresses have been provided. The MDCDSM 614 returns to the IDLE state if no operation has been started or if the MEMSM 600 is in the C3 or RN states. The M2I state machine returns to the A state whenever the M2IABORT signal is received. On detection of the abort, the ICON block 402 determines the end of the read cycle and resets its pointers to the data in the I2M queue 414 to indicate that no data is present, thus effectively discarding the data which has been read ahead. Thus the read ahead operation terminates as soon as possible after the abort indication is received, saving time by not completing the full cache line retrieval.

Figure 15:
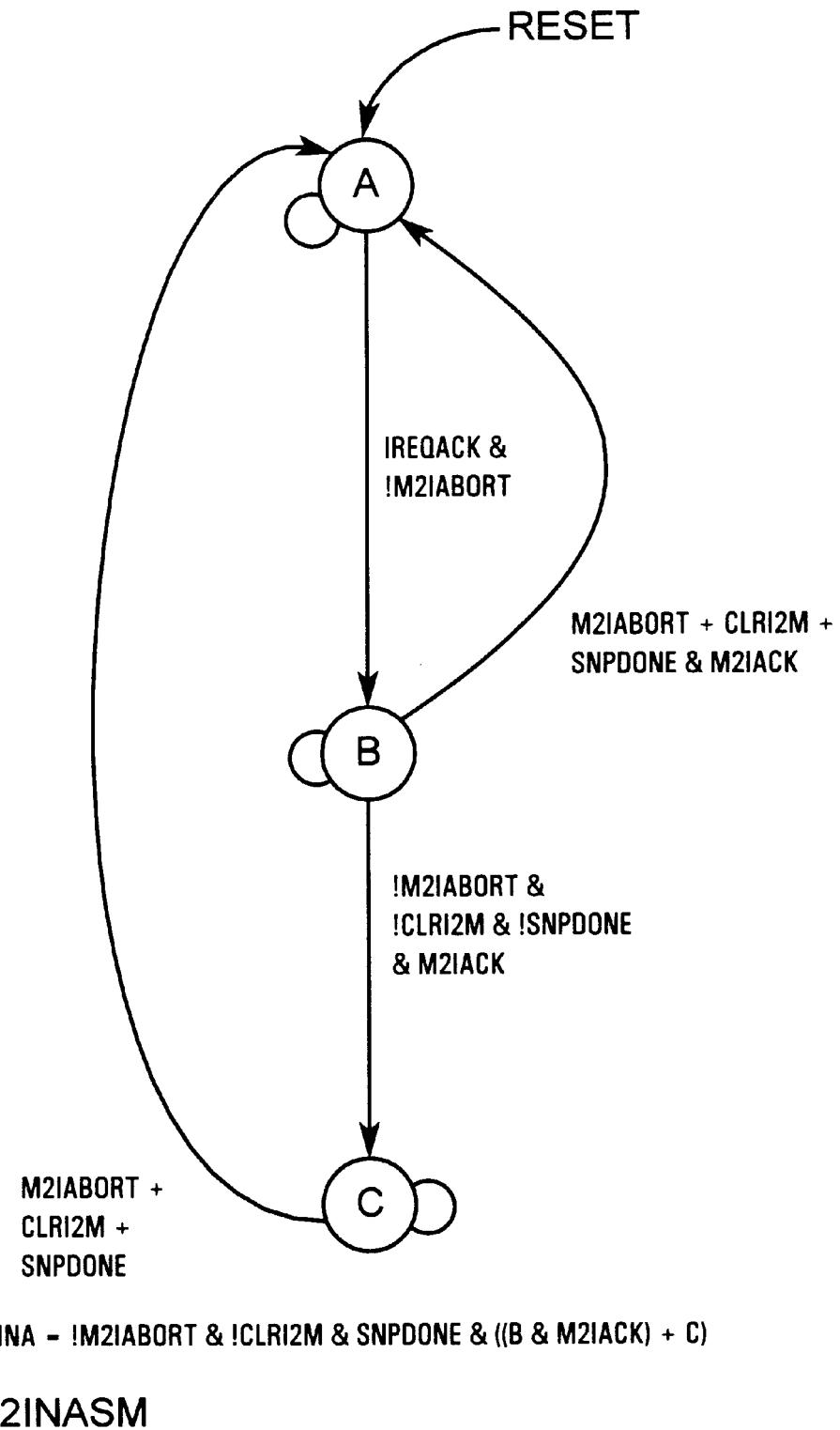

The next address indication to allow the read ahead is provided by the M2INA or memory to the PCI next address state machine shown in FIG. 15. The initial read address will have been provided using the conventional read request mechanism. An M2INA signal is provided to the MCON block 404 to indicate that the next read cycle can being. This state machine begins operation in state A upon reset and proceeds to state B if the PCI read operation is next as indicated by the IREQACK signal and is not being aborted. Otherwise, control remains at state A. Control proceeds from state B back to state A if the cycle is being aborted or if the I2M queue 414 is to be cleared because of a writeback or if the snoop has been completed and the M2IACK signal is provided indicating that the prior read operation has been acknowledged by the MCON block 404. Otherwise control remains at state B. Control proceeds from state B to state C if the cycle is not being aborted, it is not necessary to clear the queue, the snoop operation has not completed and yet an M2IACK signal has been received. Control proceeds from state C back to state A if the cycle is aborted, the I2M queue 414 is being cleared, or the snoop is completed and otherwise remains in state C. Thus the M2INA state machine returns to idle upon receipt of an abort indication.

The M2INA signal is provided to the MCON block 404 to indicate that the next address is being provided, that is, another read request can be issued to keep the I2M queue 414 filled ahead of the PCI bus 98. The M2INA signal is provided if the cycle is not being aborted, the I2M queue 414 is not being cleared, the snoop of the previous read cycle has completed and the M2INA state machine is either in state C or in state B and the M2IACK signal has been received. This M2INA signal is an indication that the processing of the prior address is complete by the MCON block 404 and the processing of the next read address can begin. The actual incrementing of the read address value is performed in the ICON block 402 using an 8 bit counter, thus limiting the total read ahead length to 256 address values. When the counter reaches 255, the read ahead operation is terminated by logic not illustrated for simplicity by causing the Memory Read Multiple to be disconnected. A new address must be received from the PCI bus master to continue the Memory Read Multiple Operation.

Therefore a memory controller according to the preferred embodiment includes many improvements. It is very flexible, allowing simple yet high performance use with a plurality of processor and memory device speeds, allowing flexibility and economics of scale. It provides improved performance by basing idle state RAS* signal level predictions on both processor and PCI bus conditions. It allows very deep write points from several buses and easily handles the various coherency issues. It also provides a quick method for ending read ahead cycles when the basic read operation has been aborted.

Figure 16:
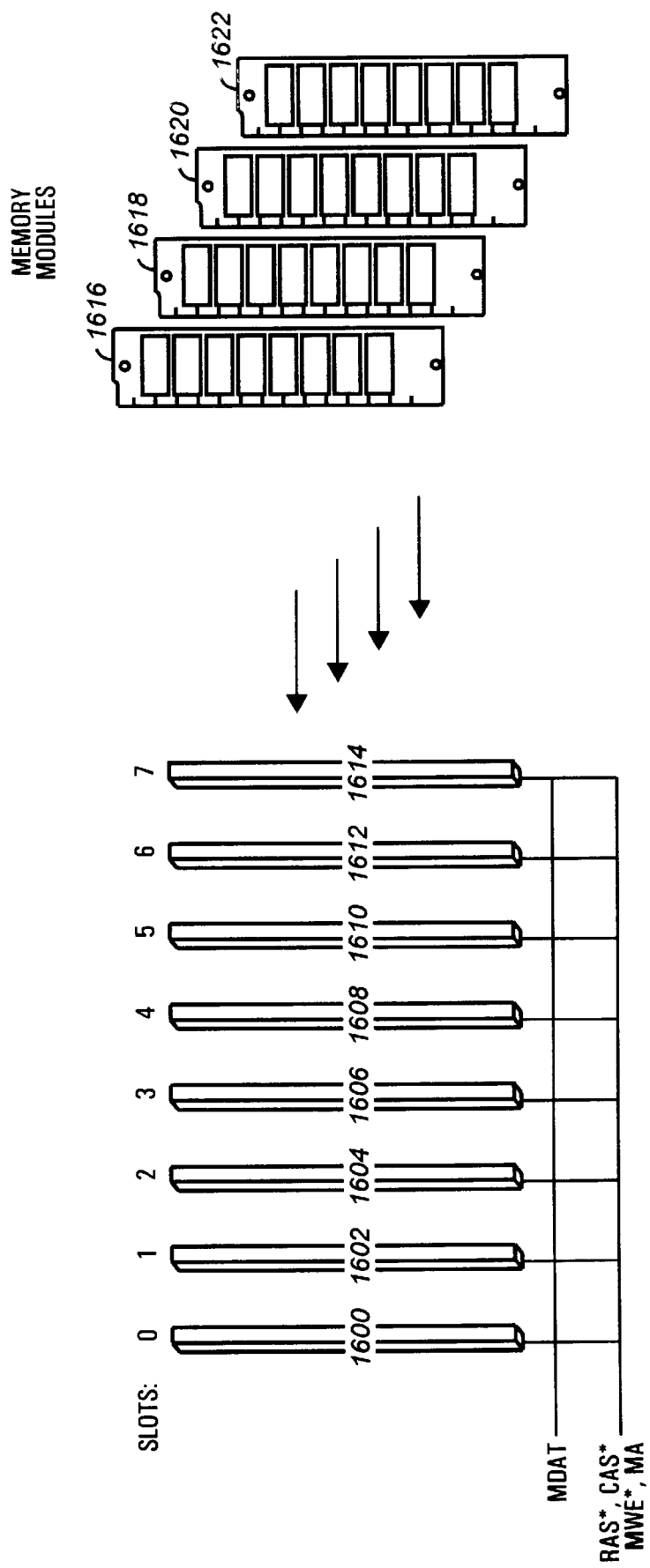
FIG. 16 is a block diagram of the memory array of FIG. 2.

Now referring to FIG. 16, there is illustrated further detail of the memory array 214. In the preferred embodiment, up to eight slots or sockets 1600–1614 are provided for receiving memory modules, such as memory modules 1616–1622. The slots 1600–1614 are 72 pin single inline memory module (SIMM) slots, which are adapted to receive the 72 pin memory modules. In the preferred embodiment, the processor 200 has a 64 bit data bus. The memory modules of the preferred embodiment have a 32 bit data width with each data line weakly pulled to +5 volts by a corresponding resistor 1624. Therefore, a bank of memory is formed when a pair of memory modules is installed into two slots. Of course, other sizes of data buses may be used without detracting from the invention. The memory modules 1616–1622 are connected and controlled by the CMC 210 through the address and data buffers 212. The data buffers 212 are connected to the processor data portion 202 and receive control signals from the CMC 210. The data buffers 212 provide a memory address bus 216 and a memory data bus 218 to the memory array 214. A memory control signal bus 220 and memory address bus 216 is provided from the CMC 210 also.

Another feature of the memory controller 210 of the preferred embodiment is that it allows great flexibility in the use of different types of DRAM devices in the memory array 214. Indeed, it allows the memory devices to vary from bank to bank, the main memory array 214 preferably being formed of eight banks or modules. The memory controller 210 of the preferred embodiment allows at least two different memory types to be utilized, with each bank being designated as one particular memory type. Each particular memory type then has a series of parameters relating to timing values as commonly utilized in DRAM specifications. Of particular interest to the present invention are two types of memory: fast page mode (FPM) and extended data output (EDO) DRAMs.

The primary difference between EDO and FPM memory is the timing of the data provided from the memories during a read cycle. For EDO memory, the data remains active on the output following a read even after the deassertion of the CAS* signals, while FPM memory tri-states its output following a read after the CAS* signals are deasserted. EDO memory tristates after RAS* is driven high or after MWE* falls if RAS* is already asserted.

Figure 22A:
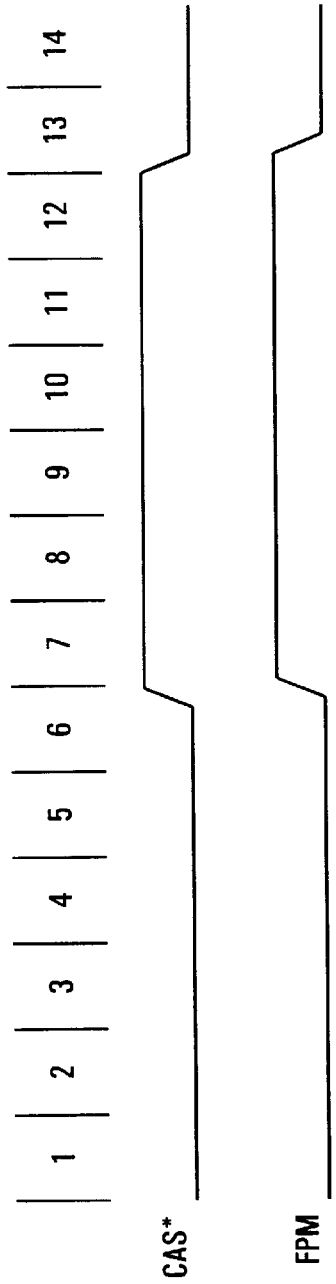
FIGS 22A and 22B are timing diagrams illustrating read cycle timing diagrams of memory control signals in FPM and EDO modes.
Figure 22B:
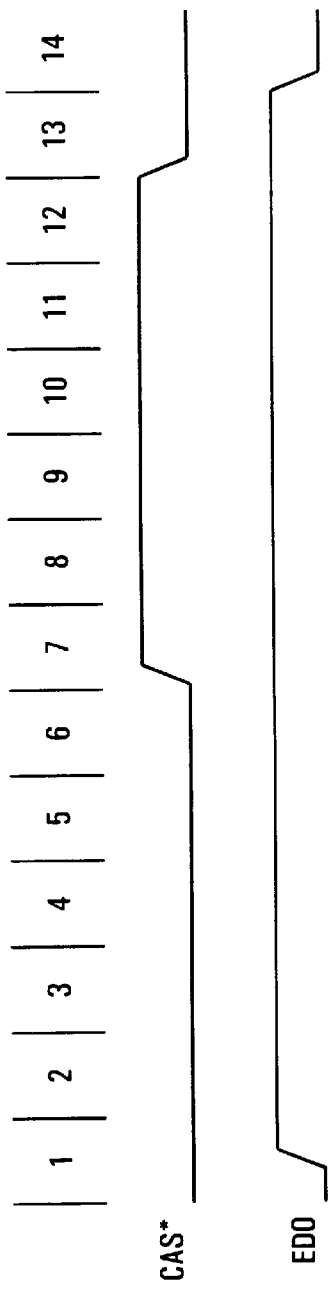

Referring back to Table 1, there is shown an EDO mode setting for the memory timing control register. As mentioned above, EDO mode changes the timing of the memory control signals to account for the early CAS* deassertion. Referring now to FIGS. 22A and 22B, there is illustrated read cycle timing diagrams of memory control signals in FPM and EDO modes respectively. Clocks 1–7 illustrate the first cycle of a burst cycle. It is noted that subsequent cycles would not need such a long RAS setup time. In FIG. 22A, data is provided from a FPM DRAM only as long as the CAS* signal is asserted. When CAS* is deasserted, the outputs are tri-stated. The CAS* precharge cycle begins on clock 7 which is the same clock data is latched. In FIG. 22B, data is provided an EDO DRAM even after CAS* is deasserted, thereby allowing a CAS* precharge cycle to begin before data is latched at clock 7.

In Table III below, there is shown an EDO detect bit. If this bit is set, the CAS* signals are disabled from being asserted. If the bit is cleared, the CAS* signals are enabled to operate according to the appropriate memory timing.

TABLE III

Secondary Miscellaneous Control Register offset 74h

| Bit 3 | EDO Detect |
| | 0 = Normal Cas Assertion * |
| | 1 = Edo Detect Mode - Turn off Cas |
| Bit 2 | EISA Posting Depth |
| | 0 = Post Two locations deep to EISA * |
| | 1 = Post One location deep to EISA |
| Bit 1 | Burst RAM Mode Bit |
| | 0 = Normal RAM Operation * |
| | 1 = Pipelined Burst RAM Operation |
| Bit 0 | M1 mode Control Bit |
| | 0 = Normal Mode (Toggle Mode) * |
| | 1 = Select M1 Processor Mode (Increment Mode) |

Memory type detection is aided by the register which is configurable to disable CAS* assertion. Also recall that on certain cycles, such as code read cycles, the memory controller 210 maintains the RAS* signals asserted for improved page hit rates. This feature is also useful to distinguish memory types.

To accurately determine the type of memory present at a location, it is desirable to first determine where memory is present. Because the EDO memories provide data after CAS* is deasserted, data bus contention is a concern that must be addressed. By first testing the memory using FPM timing, data contention is avoided as long as a write does not follow a read. That is, an FPM memory will not lead to contention if EDO memory is expected because the FPM memory would release the data bus earlier than expected. But EDO memory could lead to contention if FPM memory is expected because the EDO memory would hold the data bus longer than expected.

Figure 18:
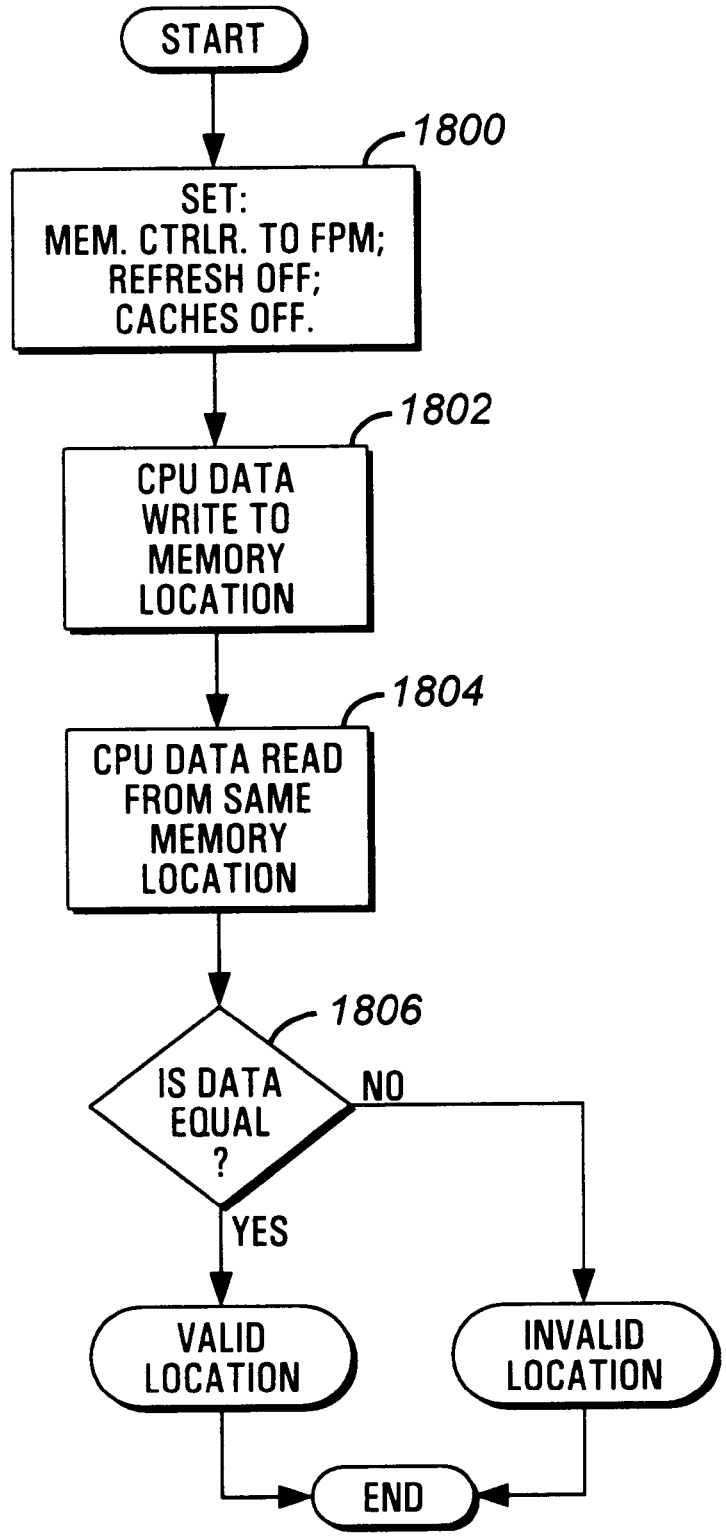
FIG. 18 is a flow digram illustrating a series of steps for validating memory locations

Referring now to FIG. 18, there is illustrated a series of steps which are performed to validate memory locations. At a step 1800, the processor 200 configures the memory controller 210 for FPM. Refreshing and caching are also disabled by the processor 200. At step 1802, the processor 200 writes known data to a likely memory location. At step 1804, the processor 200 reads from the same memory location of step 1802. At step 1806, the data read is compared to the written data. If the data read is equal to the data written, the location is deemed to be a valid memory location. If not, the memory location is deemed invalid. This test is repeated to determine which slots 1600–1614 are populated within memory module 1616–1622.

This memory validation test also performs the memory validation testing in an order so that memory contention will be avoided and data will be more accurate. Essentially, memory contention is avoided if write cycles do not follow a read cycle since EDO memory may be present. That is, if a read from EDO memory is followed by a write, both the EDO memory and the data buffers 212 will be attempting to simultaneously drive the data bus. Once valid memory locations are determined, the type of memory present may be determined.

Referring now to FIG. 18, there is illustrated a series of steps which are performed to validate memory locations. At a step 1800, the processor 200 configures the memory controller 200 for FPM. Refreshing and caching are also disabled by the processor 200. At step 1802, the processor 200 writes a known data pattern to a target memory location. At step 1804, the processor 200 writes a different pattern to a different memory location. This is done to eliminate the effects of bus charging. After a write operation, residual effects of applied voltages can cause the bus to be charged so that a subsequent read operation to a non-existant memory location might return the same data that was intended to be written. By writting a different pattern, the bus is charged to a different value. At step 1806, the processor 200 reads from the target memory location of step 1802. At step 1808, the data read at step 1806 is compared to the data written in step 1802. If the data read is equal to the data written, the location is deemed to be a valid memory location. If not, the memory location is deemed invalid. This test is repeated to determine which slots 1600–1614 are populated with memory modules 1616–1622.

This memory validation test also performs the memory validation testing in an order so that so that memory contention will be avoided and data will be more accurate. Essentially, memory contention is avoided if write cycles do not follow a read cycle since EDO memory may be present. That is, if a read from EDO memory is immediately followed by a write, both the EDO memory and the data buffers 212 will be attempting to simultaneously drive the data bus. To prevent this condition from occuring after an EDO read, the memory write strobe (MWE*) signal is strobed to cause any EDO DRAMs to tri-state their data bus. Once valid memory locations are determined, the type of memory present may be determined.

Figure 19:
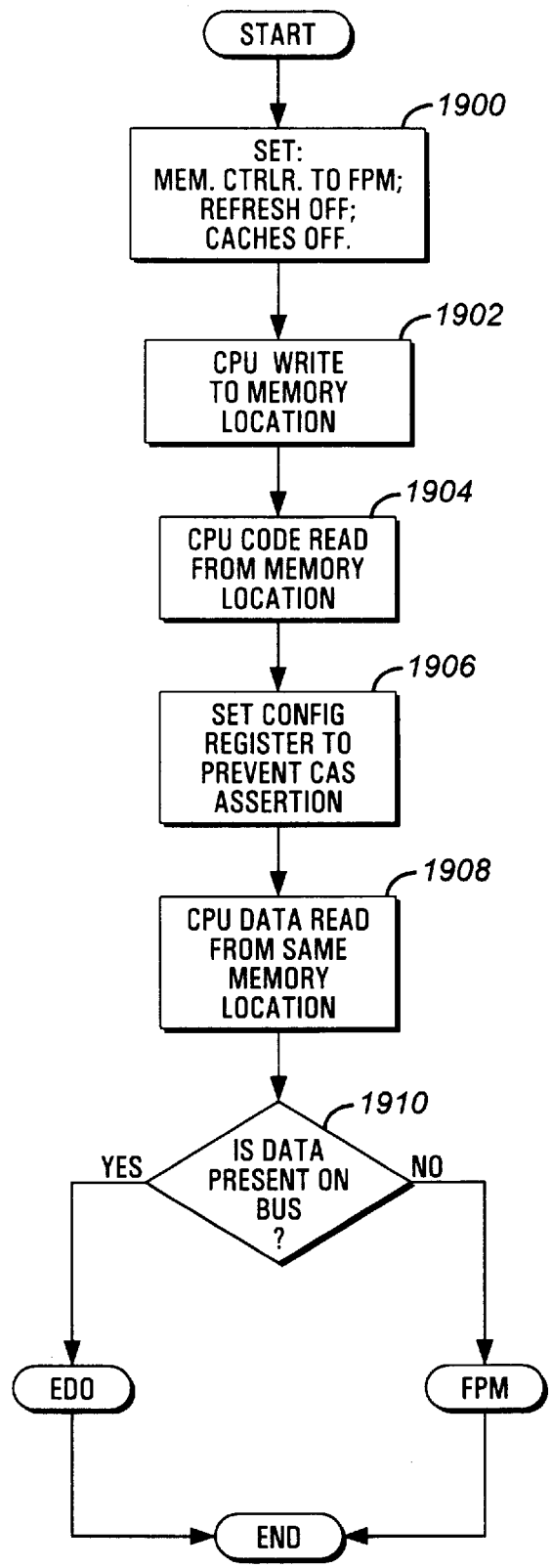
FIG. 19 is a flow diagram illustrating a series of steps for detecting a valid memory location according to the preferred embodiment.

Referring now to FIG. 19, there is illustrated a flow diagram of steps performed for detecting the type of DRAM present in the memory array 214. In the preferred embodiment, these steps are performed by the processor 200, however, it is contemplated that the memory controller 210 could be modified to perform these operations. The steps are performed during system initialization and executed from ROM 154 before memory is used. At a step 1900, the processor initializes the memory controller 210 for EDO detection by first setting the memory controller 200 for FPM timing. DRAM refresh is turned off, bus mastering on the PCI bus 98 is disabled, DMA transfers are disabled; and the L1 cache of the processor 200 and the L2 cache 208 are turned off. Disabling refresh assures that no refresh cycles will occur between the below described read and writes cycles. With the caches off, the read and write cycles are assured of being performed to the memory array 214 as opposed to being cached as is preferable during normal system operation for performance reasons.

Next at step 1902, the processor 200 writes an executable code segment, such as a jump operation, to a known memory location (say, 0h) of the memory array 214. The jump instruction causes the processor to jump back to code in ROM memory space. Also at step 1902, there is a pattern written at an offset 20h from the known memory location. This is done because of prefetching characteristics of the Pentium processor of the preferred embodiment as will become apparent below. The pattern is written at offset 20h in anticipation of the prefetching. At step 1904, the processor 200 executes a small code segment which causes a first jump from ROM memory space to the known memory location (0h) of the memory arrary 214 where the second jump instruction takes the processor 200 back into ROM memory space. The processor 200 performs a code read cycle from the known memory location to perform the jump instruction. The memory controller 200 will interpret the code read cycle as one of the cycles for which the RAS* signals can remain asserted for improved page hits. In performing the code read, the processor 200 fetches a full 32-byte cache line beginning at 0h. When the second jump instruction is executed, the processor inherently prefetches the next quadword beginning at offset 20h.

At step 1906, the processor sets the register at offset 74h in the memory controller 210 preventing the CAS* signals from being asserted on memory cycles. Next the processor performs a memory or data read cycle from the memory location at offset 20h. In this read cycle, the RAS* signals will have already been asserted from the previous code read cycle, however, the CAS* signals will be prevented from strobing in a column address. Since the CAS* signals are not asserted for this second read, the previous data prefetched at offset 20h at step 1904 will still be present on the memory data bus if the DRAM is EDO. The MRDY signal is returned from the memory controller 210 according to the timing for FPM DRAMs and the processor 200 latches in whatever values are present on the data bus. At step 1910, the processor determines if the read data values match the written pattern. If the data values match the pattern, then there must be EDO DRAM at that memory location driving the bus. If not so, then the pull-up resistors 1624 have caused the data values to change and there must be FPM DRAM at that memory location. The pattern will not be present if the DRAM is FPM, since FPM DRAMs tri-state their data outputs once the CAS* signals are deasserted. Once the DRAM type is determined at a given memory location, other locations can be checked until the entire memory array 214 is profiled on a per slot or bank basis.

It is understood that the offset 20h is processor dependent and that other offsets caused by different prefetching characteristics of alternative processors are easily adapted to the present invention. For example, if prefetching was disabled completely, the memory read operation of step 1908 could be performed at the same memory location as the jump instruction of step 1904.

Thus, the processor 200 and memory controller 210 combine to validate and detect the different types of memory present in the memory array 214. This method is transparently performed during system initialization making it unnecessary for the user to manually configure any installed memory. The memory array 214 is then available for use by any of the computer system devices, such as hard disk 123 or 147.

Figure 20:
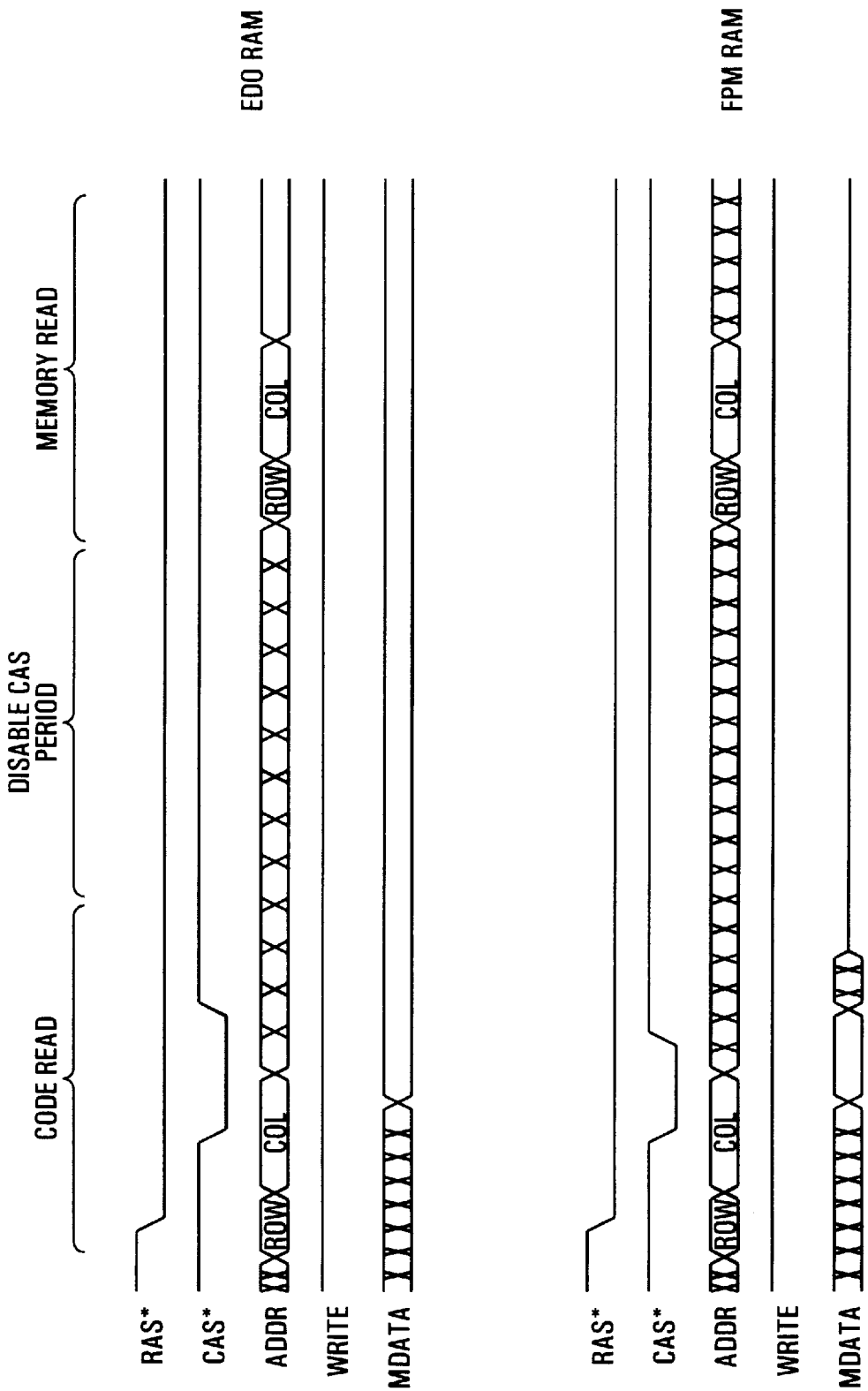
FIG. 20 is a flow diagram illustrating a series of steps for detecting memory types according to the preferred embodiment.
Figure 21A:
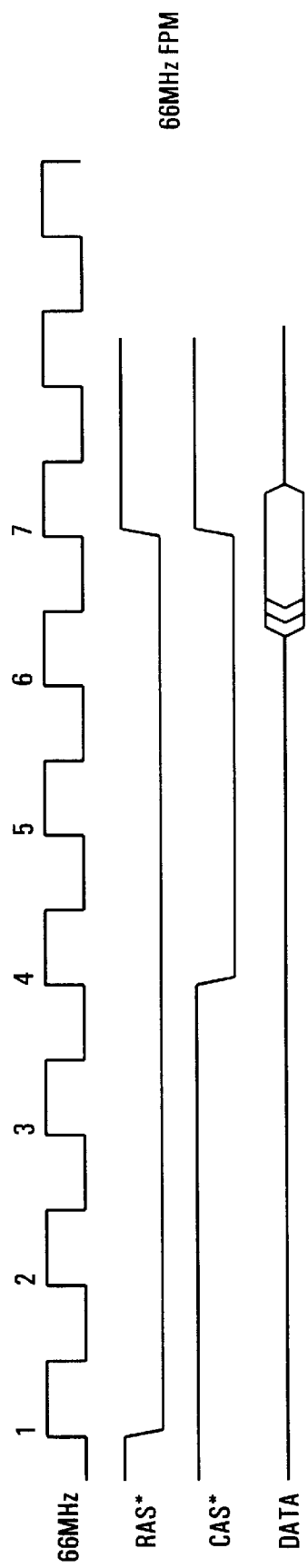
FIGS. 21A and 21B are illustrating memory timing for different memory types.
Figure 21B:
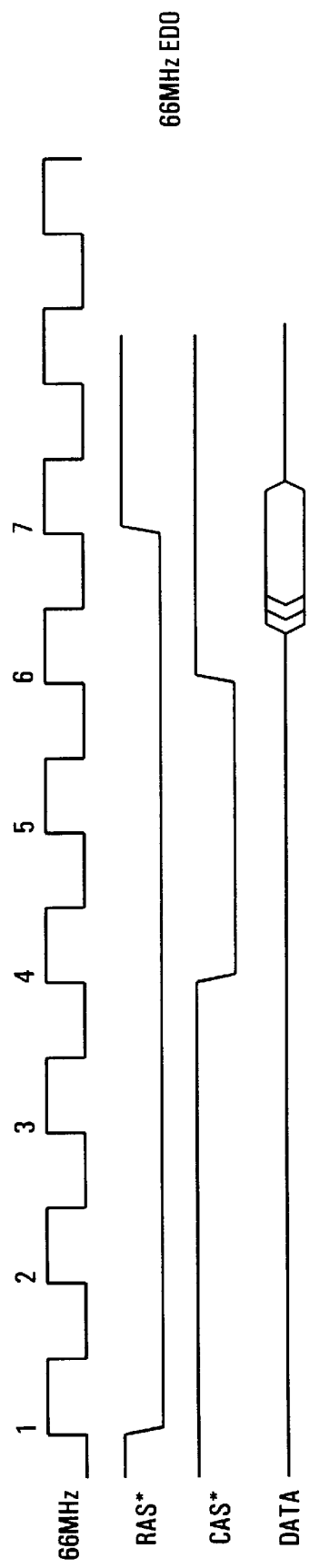

Referring finally to FIG. 20, there is illustrated a pair of timing diagrams showing the difference between an EDO and FPM DRAM. For an EDO DRAM, the code read operation causes the memory data bus 218 to remain valid or asserted. Therefore, after the CAS* signals have been disabled, a subsequent memory read operation to the same memory location returns the same data as the code read operation. To tri-state the outputs of the EDO DRAM after a read operation and before a write operation, the MWE* signal is toggled low when CAS* is deasserted, thereby ensuring that data contention is avoided.

For a FPM DRAM, the subsequent memory read operation will likely not return the same data since the memory data signals 218 are tri-stated by the FPM DRAM after the CAS* signals are deasserted.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method of detecting memory type in a computer system, the computer system including a memory controller having a control register, said memory receiving a row address strobe and a column address strobe, the method comprising the steps of:
   (a) writing a known data value to a first memory location;
   (b) reading a first data value from the first memory location, after step (a);
   (c) causing the row address strobe to remain asserted following the read cycle of step (b) when a memory type detection bit of the control register is set;
   (d) disabling the column address strobe from being asserted after the read cycle of step (b);
   (e) after steps (c) and (d), reading a second data value from the first memory location; and
   (f) comparing said first and second data values,
wherein if said first data value matches said second data value and said memory is an extended data output type memory, otherwise said memory is a fast page mode type memory and wherein the data value of steps (a) and (b) are code values and step (b) is performed with a code read operation.

2. The method of claim 1, wherein said computer system includes at least one cache, a direct memory access (DMA) controller, bus masters and wherein said memory is periodically refreshed, the method further comprising the following steps performed before step (a):
   (g) disabling said cache;
   (h) disabling refreshing of said memory;
   (i) disabling said DMA controller; and
   (j) disabling said bus masters from bus mastering.

3. The method of claim 1, further comprising the steps of:
   (k) selecting a first memory address; and
   (l) validating that memory exists at the first memory address before performing steps (a)–(f).

4. The method of claim 3, further comprising the step of:
   (m) repeating steps (k)–(l) for a plurality of memory addresses and steps (a)–(f) for a plurality of memory locations.

5. The method of claim 3, step (1) further comprising the steps of:
- (n) writing a known test value to said first memory address;
- (o) reading a first test value from said first memory address; and
- (p) comparing said first test value to said known test value, wherein if said first test value matches said known test value said memory address is a valid memory location.

6. The method of claim 5, further comprising the step of:
- (q) writing a different test value to a different address from said first memory address before step (o) and after step (n).

7. The method of claim 5, wherein said computer system includes a cache, wherein said memory is periodically refreshed, the method further comprising the following steps performed before step (n):
- (r) disabling said cache;
- (s) disabling refreshing of said memory
- (t) disabling said DMA controller; and
- (u) disabling said bus masters from bus mastering.

8. The method of claim 1, wherein said writing and reading steps are performed using fast page mode timing.

9. The method of claim 1, wherein step (e) is performed with a memory data read operation.

10. The method of claim 1, wherein step (a) further comprises the steps of:
- (v) writing an instruction to said first memory location;
- (w) writing a pattern at an offset from said first memory location;

wherein the offset is determined according to a number of prefetched memory locations.

11. The method of claim 1, step (b), comprising the step of:
- (v) reading a first data value from the first memory location using fast page mode timing.

12. The method of claim 1, further comprising the step of:
- (w) deasserting a memory write strobe to tristate memory data signals of the memory after step (c) if the memory is an extended data out memory.

13. A computer system comprising:
- a bus;
- a processor coupled to said bus for providing read and write cycles;
- a mass storage system coupled to said bus;
- at least one memory device; and
- a memory controller coupled to said bus and between said bus and said memory device, said memory controller for providing row address strobe and column address strobe signals to said memory device, said memory controller including:
  - a switch for selectably preventing said column address strobe signals from being provided;
  - a control register having a memory type detection bit; and
  - a page hit detector for maintaining said row address strobe signals in a provided state when a page hit is detected,
- wherein upon power-up said processor causes the following steps to be performed:
  - (a) writing a known value to a first memory location;
  - (b) reading a first data value from the first memory location, after step (a);
  - (c) causing the row address strobe to remain asserted following the read cycle of step (b) when a memory type detection bit of the control register is set;
  - (d) disabling the column address strobe from being asserted following the read cycle of step (b);
  - (e) after steps (c) and (d), reading a second data value from the first memory location; and
  - (f) comparing said first and second data values, wherein if said first data value matches said second data value and said memory is an extended data output type memory, otherwise said memory is a fast page mode type memory and wherein the data value of steps (a) and (b) are code values and step (b) is performed with a code read operation.

14. The computer system of claim 13, further comprising:
- a cache between said processor and said memory;
- a direct memory access (DMA) controller coupled to said bus; and
- one or more bus matters coupled to said bus, and
- wherein said memory controller further includes a refresh timer for periodically causing said memory controller to refresh said memory and
- wherein said processor further causes the following steps to be performed before step (a):
  - (g) disabling said cache;
  - (h) disabling said refresh timer;
  - (i) disabling said DMA controller; and
  - (j) disabling said bus masters from bus mastering.

15. The computer system of claim 13, wherein said processor further causes the following steps to be performed:
- (k) selecting a first memory address; and
- (l) validating that memory exists at the first memory address before performing steps (a)–(f).

16. The computer system of claim 15, wherein said processor further causes the following step to be performed:
- (m) repeating steps (k)–(l) for a plurality of memory addresses and steps (a)–(f) for a plurality of memory locations.

17. The computer system of claim 15, wherein said processor further causes the following steps to be performed:
- (n) writing a known test value to said first memory address;
- (o) reading a first test value from said first memory address; and
- (p) comparing said first test value to said known test value, wherein if said first test value matches said known test value said memory address is a valid memory location.

18. The computer system of claim 17, wherein said processor further covers the following step to be performed before step (o) and after step (n):
- (q) writing a dummy value to a different address from said first memory address to prevent a false match.

19. The computer system of claim 17, further comprising:
- a cache between said processor and said memory;
- a direct memory access (DMA) controller coupled to said bus;
- one or more bus masters coupled to said bus; and
- wherein said memory controller further includes:
  - a refresh timer for periodically causing said memory controller to refresh said memory; and wherein said processor further causes the following steps to be performed before performing step (n):
- (r) disabling said cache;
- (s) disabling said refresh timer;
- (t) disabling said DMA controller; and
- (u) disabling said bus masters from bus mastering.

20. The computer system of claim 13, wherein said writing and reading steps are performed using fast page mode timing.

21. The computer system of claim 13, wherein step (e) is performed with a memory data read operation.

22. The computer system of claim 13, wherein step (a) further comprises the steps of:
- (u) writing an instruction to said first memory location;
- (v) writing a pattern at an offset from said first memory location;

wherein the offset is determined according to a number of prefetched locations.

23. The computer system of claim 13, wherein said bus includes a plurality of data lines and each said data line is biased with a resistor forcing said bus to float to a proper data value.

24. The computer system of claim 23, wherein the resistor causes a mismatch between the compared data values if the memory is a fast page mode memory.

* * * * *

UNITED STATES PATENT AND TRADEMARK OFFICE
CERTIFICATE OF CORRECTION

PATENT NO. : 5,974,501
DATED : October 26, 1999
INVENTOR(S) : Charles N. Shaver et al.

It is certified that error appears in the above-identified patent and that said Letters Patent is hereby corrected as shown below:

<u>Column 3,</u>
Line 43, delete "Fig. 17 is a flow diagram illustrating a series of steps for detecting a valid memory location according to the preferred embodiment; --.

<u>Column 24,</u>
Lines 1-23, delete these two paragraphs.

<u>Column 26,</u>
Line 6, delete "Fig. 20" and insert -- Figures 20A and 20B --.

Signed and Sealed this

Seventh Day of February, 2006

JON W. DUDAS
*Director of the United States Patent and Trademark Office*